United States Patent
Teruzzi

(10) Patent No.: US 10,179,721 B2
(45) Date of Patent: Jan. 15, 2019

(54) DEVICE FOR AUTOMATICALLY CONNECTING A VEHICLE TO AN ELECTRIC POWER SUPPLY

(71) Applicant: Ipalco BV, Woerden (NL)

(72) Inventor: Sandro Teruzzi, Nova Milanese (IT)

(73) Assignee: Ipalco BV, Woerden (NL)

( * ) Notice: Subject to any disclaimer, the term of this patent is extended or adjusted under 35 U.S.C. 154(b) by 36 days.

(21) Appl. No.: 14/770,779

(22) PCT Filed: Feb. 27, 2014

(86) PCT No.: PCT/EP2014/053813
§ 371 (c)(1),
(2) Date: Aug. 26, 2015

(87) PCT Pub. No.: WO2014/131826
PCT Pub. Date: Sep. 4, 2014

(65) Prior Publication Data
US 2016/0009530 A1 Jan. 14, 2016

(30) Foreign Application Priority Data

Feb. 27, 2013 (LU) .......................................... 92160
Feb. 27, 2013 (LU) .......................................... 92161

(51) Int. Cl.
*B66C 13/12* (2006.01)
*B66C 19/00* (2006.01)
(Continued)

(52) U.S. Cl.
CPC ............ *B66C 13/12* (2013.01); *B66C 19/007* (2013.01); *H01H 9/54* (2013.01); *H01R 13/6205* (2013.01); *H02G 11/02* (2013.01)

(58) Field of Classification Search
CPC ....... B66C 13/12; B66C 19/07; B66C 19/007; H02G 11/02; H01H 9/54; H01R 13/6205;
(Continued)

(56) References Cited

U.S. PATENT DOCUMENTS 3,575,300 A * 4/1971 Durand .................... B66C 7/00
212/228
4,138,177 A * 2/1979 Van Valer .............. B60K 37/00
191/12.4
(Continued)

FOREIGN PATENT DOCUMENTS

| CN | 202148142 U | 2/2012 |
| JP | 2011073846 A | 4/2011 |

OTHER PUBLICATIONS

International Search Report, International Patent Application No. PCT/EP2014/053813, dated May 26, 2014, 4 pages.

*Primary Examiner* — Mark T Le
(74) *Attorney, Agent, or Firm* — Fitch, Even, Tabin & Flannery LLP

(57) ABSTRACT

A device for automatically connecting a vehicle to an electric power supply, comprises: a turn-over-anchor (48, 210), including a first connector part (42, 216) connected to the cable (28, 208); and a docking station (50, 212), including a second connector part (44, 230) configured for mating with the first connector part (42, 216) according to a vertical coupling axis (47, 236), when the turn-over-anchor (48, 210) is vertically deposited into the docking station (50, 212). The device further includes two horizontally spaced vertical rods (58', 58", 246', 246"), each of which is arranged so as to vertically penetrate into a guide opening or hole (62', 62", 248', 248") of an opposite element (50', 50"), when the turn-over-anchor (48, 210) is deposited into the docking station (50, 212), and is dimensioned so as to be self-locking in the hole (62', 62", 248', 248"), if the turn-over-anchor
(Continued)

(48, 210) is subjected to a significant force that is not aligned with the vertical coupling axis (47, 236).

22 Claims, 10 Drawing Sheets

(51) Int. Cl.
*H01H 9/54* (2006.01)
*H01R 13/62* (2006.01)
*H02G 11/02* (2006.01)

(58) Field of Classification Search
CPC .. H01R 13/62; H01R 13/631; H01R 12/7005; H01R 13/6272; H01R 13/629; H01R 13/64
USPC ........................................................ 191/12.4
See application file for complete search history.

(56) References Cited

U.S. PATENT DOCUMENTS

| | | | | |
|---|---|---|---|---|
| 5,391,091 A * | 2/1995 | Nations | ................ | H01R 13/631 439/359 |
| 5,466,171 A * | 11/1995 | Bixler | ................... | H01R 13/64 439/378 |
| 8,096,819 B1 * | 1/2012 | Rosero | ............... | H01R 13/4536 439/135 |
| 8,718,856 B2 * | 5/2014 | Leary | ................. | B60L 11/1824 320/104 |
| 2007/0227998 A1 * | 10/2007 | He | ........................ | B66C 19/007 212/344 |
| 2010/0233889 A1 * | 9/2010 | Kiani | ..................... | H01R 11/30 439/39 |
| 2010/0308768 A1 * | 12/2010 | Dower | ................ | B60L 11/1818 320/109 |

* cited by examiner

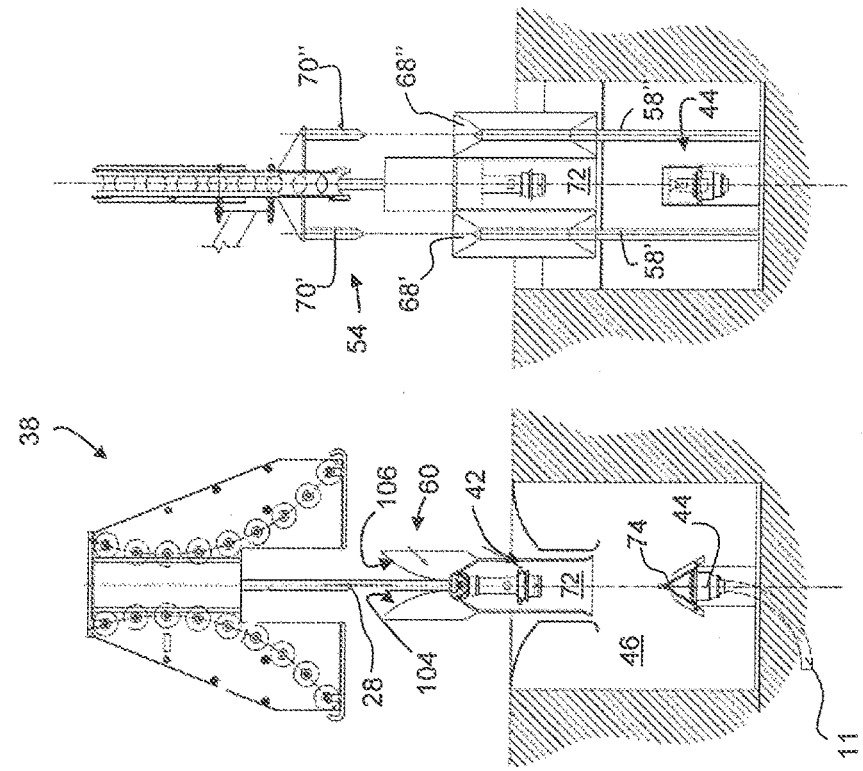
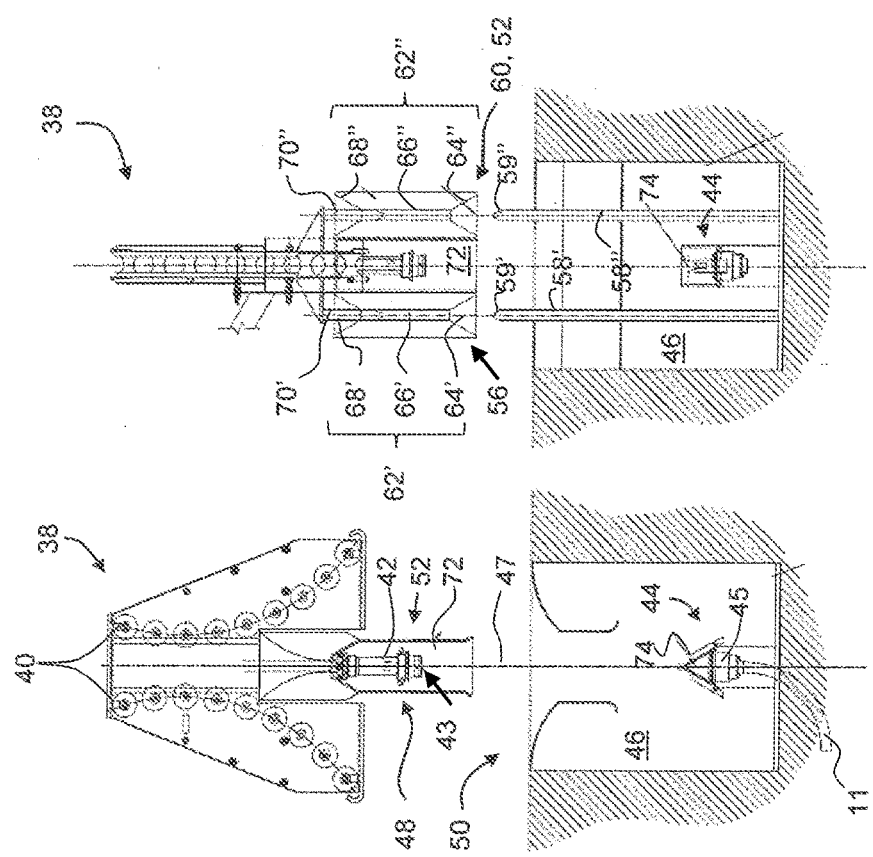
FIG. 3A  FIG. 3B  FIG. 4A  FIG. 4B

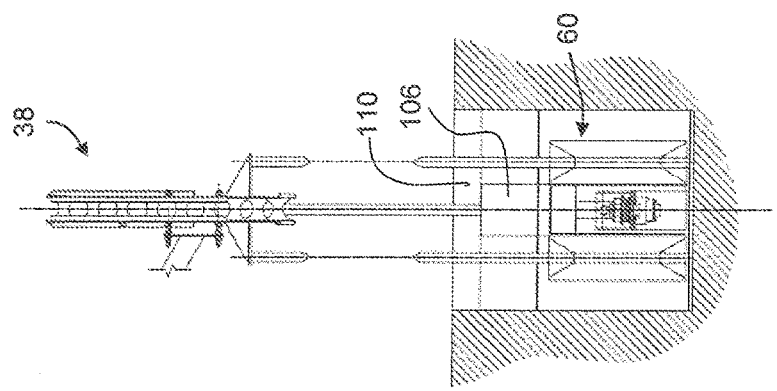
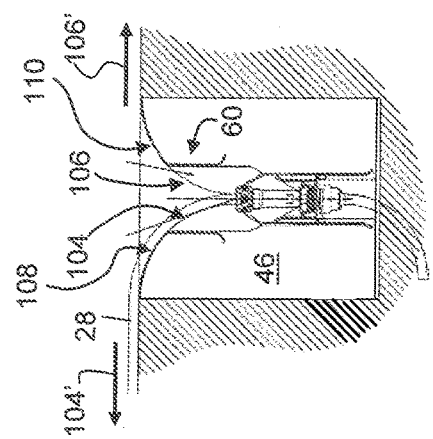
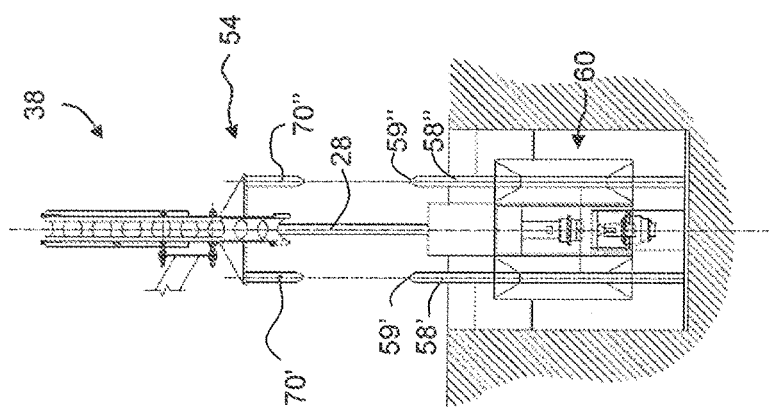
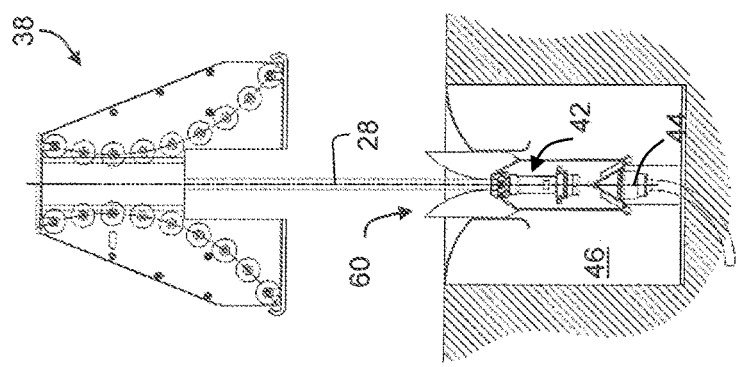
FIG. 5A
FIG. 5B
FIG. 6A
FIG. 6B

DEVICE FOR AUTOMATICALLY CONNECTING A VEHICLE TO AN ELECTRIC POWER SUPPLY

TECHNICAL FIELD

The present invention generally relates to a device for automatically connecting a vehicle to an electric power supply. It relates more particularly to a device for automatically connecting a mobile gantry crane to an electric power supply.

BACKGROUND ART

In container yards, mobile gantry cranes are used for lifting, moving and stacking freight containers.

A first type of such a gantry crane moves with steel wheels on a rail track, which consists of two rails bordering a substantially rectangular container stacking area lengthwise. These first gantry cranes are referred to as rail-mounted gantry cranes (RMG cranes). RMG cranes are generally electrically powered via a power cable wound on a cable reel or winch mounted on one side of the gantry crane. To avoid damaging the power cable, the latter is—during movement of the RMG along its rail track—placed in a trench extending along one of the rails of the rail track, plumb-vertically under the horizontal trajectory of the cable reel or winch. A major disadvantage of RMG cranes is that for servicing two container stacking areas not located along the same rail track, two different RMG cranes are required, because the RMG crane cannot travel from a first rail track onto a second rail track.

Another type of gantry crane used in container yards has wheels with rubber tires instead of steel wheels and is therefore generally referred to as a rubber tired gantry crane (RTG crane). Such RTG crane is not limited to moving along a specific rail track. With its rubber tires, the RTG crane moves on prepared surfaces known as runways, wherein two runways bordering a container stacking form a so called lane. RTG crane wheels are generally steerable for changing the direction of travel of the RTG crane, for example for moving from one container stacking area to another, i.e. from a first lane to a second lane. Consequently, RTG cranes provide a greater flexibility of use than RMG cranes. However, as an RTG crane must be capable of moving between two distant container stacking areas, they can no longer be powered by a fixed connection to electric power mains.

Most RTG cranes are therefore powered by an on-board diesel engine coupled to an electric generator. On the RTG crane, the generator powered by the diesel engine supplies electric power to electric motors for moving the RTG crane and operating the hoist and other equipment. However, environmental and maintenance issues, as well as strongly increasing diesel prices are making onboard diesel engines less and less attractive.

Consequently, more and more RTG cranes use their diesel engine only for moving from one container stacking area to another, i.e. for so-called cross-lane manoeuvres. When operating along a straight lane for servicing one specific container stacking area, the diesel engine of such an RTG crane is shut down and its electric motors are powered with electricity from the electric power mains.

A first system for supplying electricity from the electric power mains to an RTG crane travelling along a lane comprises a conductor rail systems extending along a runway of the lane. On the RTG crane is mounted a self engaging current collector trolley. When the RTG crane arrives at the new lane, its collector trolley automatically engages the conductor rails, so that the RTG crane is automatically connected to the electric power mains. It will however be noted that the collector trolley and/or the conductor rails are easily damaged, and that the collector rails present moreover a high risk of electrocution.

According to an alternative system, electric power is supplied to the RTG crane through a power cable, just as explained above for an RMG crane. This means that as the RTG crane moves along the RTG lane, the power cable is lifted from a cable trench or a cable path extending along a runway of the lane and wound around a crane-mounted cable reel. When the RTG crane moves in the opposite direction along the lane, the power cable is unwound from this cable reel and placed back into the cable trench or on the cable path.

Such an RTG crane is, for example, disclosed in EP 1 820 769 A1 (the reference numbers used in the present paragraph refer to the reference numbers used in this prior art document). In order to allow cross-lane manoeuvres, a so-called joint-box 20 is associated with each cable trench 22, and the free end of the power cable 18 is equipped with a plug which is removably connectable to a socket in the joint-box 20. Prior to carrying out a cross-lane manoeuvre between a first lane and a second lane, the plug of the power cable 18 is disconnected from the socket in the joint-box 20 of the cable trench 22 extending along the first lane. The RTG crane can now travel with its on-board diesel engine from the first to the second lane and—after it is properly positioned in the second lane—the plug of the power cable is connected to the socket in the joint-box of the cable trench extending along this second lane.

It will be appreciated that manually disconnecting the plug of the power cable from the socket in the joint-box of the first cable trench and manually reconnecting it to the socket of the joint-box of the second cable trench, are time consuming, burdensome and potentially dangerous. They are time consuming, because the crane operator must leave his control cabin, which is normally fixed to a trolley at the top of the gantry crane, must descend to ground-level, must perform the connection or disconnection, and must then return to his control cabin. If the connection/disconnection is to be carried out by another person than the crane operator, that person must be available in time for performing the connection or disconnection; otherwise even more time will be lost. These operations are burdensome tasks, because it is not easy to guide the plug with the heavy cable attached thereto into its socket arranged in a pit at floor level. Furthermore, if the connection/disconnection is made by another person than the crane operator, there is also a danger that the person making the connection/disconnection may be hit by the moving RTG crane.

Chinese utility patent CN 202148142 U discloses a device for automatically connecting a mobile gantry crane via a cable to an electric power supply. This mechanism comprises a plug frame, a socket frame, a connection mechanism and a locking mechanism. The plug frame includes a first connector part connected to a free end of the cable. The socket frame includes a second connector part configured for mating with the first connector part according to a vertical coupling axis, when the plug frame is vertically deposited into the socket frame. The connection mechanism is arranged on the gantry crane and comprises a horizontal expansion module and an up-down moving module. It supports the plug frame via detachable coupling mechanism and deposits it into the socket frame, wherein a funnel-shaped guide means laterally aligns the plug frame with the socket frame. Before the connection mechanism is decoupled from the plug frame, the latter is locked in the socket frame by means of a locking mechanism, comprising an actuator driving e.g. a locking pin. Such a locking mechanism has however many drawbacks. For example, if the locking mechanism does not properly unlock during the disconnecting procedure, the whole system may be seriously damaged. Similarly, if the locking mechanism does not properly lock the plug frame in the socket frame during the connecting procedure, the plug frame will be ripped out of the socket frame by the gantry crane and, if nothing else, the connectors will be destroyed.

Consequently, there is a need for a simple and cost efficient device for connecting a vehicle, in particular an RTG crane, to an electric power supply, which would, in principle, make a manual intervention in the power cable connection/disconnection operations superfluous.

JP 2011-073846 A discloses a crane feeder system for feeding a crane, which handles ocean transport containers, with electric power from a feeder placed along a lane. The system comprises a feeding carriage which is moved along the feeder. A connecting device includes a male portion connected to a free cable end hanging down from the crane and a female portion mounted on the feeding carriage. The male portion has a conical body with a plurality of electrode rings. The female portion has a conical cavity for receiving the conical body of the male portion, and a plurality of electrode rings capable of mating with the electrode rings of the male portion. Connection is achieved by lowering the conical body of the male portion vertically into the conical cavity of the female portion. This Japanese document does not appear to disclose any locking means for locking the male portion within the female portion. It follows that the male portion and the female portion may disconnect when the crane is moved relative to the feeding carriage.

SUMMARY OF INVENTION

The present invention concerns a device for automatically connecting a vehicle via a cable to an electric power supply. This device comprises: a turn-over-anchor (or mobile part) including a first connector part connected to a free end of the cable; and a docking station (or fixed part) including a second connector part configured for mating with the first connector part according to a vertical coupling axis, when the turn-over-anchor is vertically deposited into the docking station.

In accordance with a first aspect of the present invention, the device further comprises horizontally spaced vertical guide rods, each of the rods being arranged so as to vertically penetrate into a guide hole (or guide opening) of an opposite element, when the turn-over-anchor is deposited into the docking station, and being dimensioned so as to be self-locking in the guide hole, if the turn-over-anchor is subjected to a significant force that is not aligned with the vertical coupling axis. It will be appreciated that the aforementioned guide rods and guide holes efficiently prevent any tipping motion or vertical motion of the turn-over-anchor that may cause disconnection, thereby rendering any mechanism for locking the turn-over-anchor in the docking station superfluous. Thus the aforementioned drawbacks of the locking mechanism disclosed in CN 202148142 U are efficiently eliminated, and the device in accordance with the present invention becomes safer and more reliable.

In a preferred embodiment, the vertical guide rods are arranged in the docking station and the guide holes are arranged in one or more elements of the turn-over-anchor. Thus the movable element, i.e. the turn-over-anchor, may be more compact.

In a preferred embodiment, each of the guide holes has a funnel-shaped inlet followed by a substantially cylindrical portion, so that, when the turn-over-anchor is lowered into the docking station, the funnel shaped inlet cooperates with a tip of the guide rod to guide the rod into the substantially cylindrical portion, and thereafter the substantially cylindrical portion cooperates with the guide rod to guide the turn-over-anchor with the required accuracy into contact position. In this embodiment, the guide rods and guide holes are additionally used for centring the turn-over-anchor in its docking station.

In a preferred embodiment, the horizontally spaced vertical guide rods are arranged symmetrically with regard to the first or second connector part. This arrangement warrants a very efficient protection of the connectors.

According to a further aspect of the invention, the turn-over-anchor includes a cable drum. The free end of the cable connected to the first connector part is guided at least partly around the cable drum. The turn-over-anchor is designed so that the cable may leave the cable drum at two locations preferably spaced by about 180° around the cable drum and eccentric relative to the vertical coupling axis, so that the force the cable exerts onto the turn-over-anchor is never aligned with the vertical coupling axis. In the embodiment with the two guide rods, the cable drum synergistically supports the locking function of the two guide rods, warranting that the cable can never pull the turn-over-anchor out of its docking station.

According to a further aspect of the invention, the first and/or the second connector part includes a normally closed protection cover which it covers the first, respectively second connector part, wherein its opening is triggered by the turn-over-anchor deposited into the docking station. The protection cover prevents rain and snow from penetrating into a disconnected connector part and protects the contact elements therein against mechanical damage. It is also a further safety feature against electrocution.

In a preferred embodiment, the protection cover is pivotable about a horizontal axis and includes a lever arm for pivoting it about the horizontal axis from its closed position, into an open position, in which it uncovers the first, respectively second connector part. The device further includes: a pusher element cooperating with the lever arm for pivoting the cover into the open position, when the turn-over-anchor is deposited into the docking station; and a closing spring for urging the protection cover into the closed position, when the turn-over-anchor is lifted out of the docking station. Such a protection cover is very simple and fail-safe in its operation.

According to a further aspect of the invention, a normally open circuit breaker is interconnected between the electric power supply and the second connector. An open control circuit is associated with the circuit breaker to trigger a closing of the latter when closed itself. Closing means are associated with the control circuit for closing the latter when the first connector part and the second connector part interconnect. Such closing means may e.g. comprise: either two short circuited pilot contact elements in the first connector part mating with two pilot contact elements in the second connector part, which form an open contact in the control circuit; or a normally open switch, which forms an open contact in the control circuit, and is actuated in its closed position, when the first connector part and the second connector part interconnect. Such a fail-safe circuit provides a very efficient safety feature against electrocution, because the connector parts can only be powered when interconnected.

According to a further aspect, the invention provides a lifting device for vertically lowering the turn-over-anchor into in the docking station and for vertically lifting it out of the docking station.

In a preferred embodiment, the turn-over-anchor is supported by the lifting device via two horizontally spaced hook elements engaging two funnel shaped slots. The hook elements are preferably supported by the lifting device, and the two funnel shaped slots are preferably arranged on the rear side of the turn-over-anchor. This is a very simple but efficient design of a self-aligning, easily releasable coupling between the turn-over-anchor and the lifting device.

According to a further aspect of the invention, the docking station includes a vertical push-plate. The turn-over-anchor includes adjustable guide elements protruding from its front face, so that when the turn-over-anchor is pushed with the adjustable guide elements against the vertical push-plate, the axes of the first connector part and the second connector part are both located in a plane parallel to the vertical push-plate. This is a very simple but efficient means for aligning the turn-over-anchor in the docking station.

According to a further aspect, the invention provides a transfer arm for transferring the turn-over-anchor into and out of the docking station. This transfer arm advantageously includes: a first arm section for horizontally pushing the turn-over-anchor against the vertical push-plate; a vertical lifting mechanism supported by the first arm section for vertically lowering the turn-over-anchor into in the docking station and vertically lifting it out of the docking station; and a coupling device supported by the vertical lifting mechanism for coupling the latter to the turn-over-anchor. The first arm section is advantageously an extendable arm section, as e.g. a telescopic arm. However, it may also be a parallelogram type arm, which is a pivoting arm warranting that the vertical lifting mechanism remains parallel to itself during the pivoting movement of the arm. The coupling device has with regard to the vertical lifting mechanism a horizontal degree of freedom for floating perpendicularly to a vertical plan containing the central axis of the extendable arm section. The device further includes guide means capable of laterally aligning the turn-over-anchor within the docking station by using this horizontal degree of freedom of the coupling device, when the turn-over-anchor is vertically deposited into the docking station.

In a preferred embodiment, the guide means comprise: lateral guides in the docking station defining a funnel shaped inlet opening for the turn-over-anchor. Guide rolls are arranged laterally on the turn-over-anchor for interacting with the lateral guides in the docking station.

According to a further aspect of the invention, the vehicle includes a transfer arm for transferring the turn-over-anchor into and out of the docking station, which is located along a driveway of the vehicle. Alternatively, the docking station is arranged on the vehicle, and a transfer station is located along a driveway of the vehicle and includes a transfer arm for transferring the turn-over-anchor into and out of the docking station.

In accordance with another aspect, a device for connecting a vehicle, in particular a mobile gantry crane, as for example an RTG crane, to an electric power supply, comprises: a cable reel (or a cable winch) on the vehicle with a power cable wound thereon; a first connector part connected to a free end of the power cable; a mating second connector part connected to the power supply; a mobile unit (or turn-over-anchor) comprising the first connector part and a first guiding device associated therewith; and a fixed unit (or docking station) comprising the second connector part and a mating second guiding device associated therewith. When the vehicle is parked in a connecting position, wherein the first connector part and the second connector part are vertically aligned, and the power cable is then unwound from the cable reel, thereby lowering the first connector part towards the second connector part, the first guiding device is capable of engaging the second guiding device and of sliding by gravity along the second guiding device, which guides it into a contact position, in which the first connector part establishes electrical contact with the second connector part. Similarly, for automatically disconnecting the vehicle from the electric power supply, it will be sufficient to park the vehicle again in the connecting position, and to vertically raise the first connector part by winding the power cable onto the cable reel, whereby the first connector is disconnected from the second connector, and the first guiding device upwardly slides out of engagement with the second guiding device. According to a further aspect of the invention, the second guiding device comprises two vertically extending rod-like guide members; and the first guiding device comprises a guiding block with a guide opening for each of the guide members. The guide members and the guide openings are designed so that the guiding block is capable of sliding by gravity along the guide members into the contact position. It will be appreciated that the rod-like guide members cooperating with the guiding block are very simple but nevertheless very efficient guiding means. When the power cable is pulled in a direction other than a vertical direction, the guiding block is auto-blocked in the rod-like guide members, and the latter will absorb the horizontal force components, whereby they protect the interconnected connectors from being damaged.

In a preferred embodiment, each of the guide openings has a funnel-shaped inlet followed by a substantially cylindrical portion, wherein, as the guiding block is lowered towards the second connector part, the funnel shaped inlets guide the substantially cylindrical portions onto the guide members, and thereafter the substantially cylindrical portions cooperate with the guide members to guide the guiding block with the required accuracy into the contact position. Whereas the funnel shaped inlets are capable of automatically compensating significant alignment errors when the vehicle is parked in the connecting position, the substantially cylindrical portions warrant the required alignment accuracy for interconnecting the first and second connector. After interconnection has taken place, a the substantially cylindrical portions warrant a transmission of horizontal force components (generated by a non-vertical cable pull) from the guiding block onto the guide members, which is substantially free of float; whereby they protect the interconnected first and second connectors against important bending moments.

In the afore-described embodiment, to efficiently protect the first and second connector, the second connector is advantageously arranged between the vertically extending rod-like guide members; and the first connector is advantageously arranged in a cavity of the guiding block between the two guide openings. The fact that the second connector is arranged between the vertically extending rod-like guide members efficiently provides protection of this connector against excessive horizontal force components (generated by a non-vertical cable pull). The fact that the first connector is arranged in a cavity of the guiding block very efficiently provides protection of this connector against mechanical damage and splashed water, when it is not connected to the second connector.

According to a further aspect of the invention, the vehicle further comprises a cable deflection device and/or a parking station for the first guiding device arranged on the vehicle under the cable reel. The parking station for the first guiding device includes an aligning device for aligning the first guiding device in a pre-set angular position on the vehicle, when the power cable is wound onto the cable reel. This parking station with its aligning device warrants, for example, that the first guiding device always has a specific positional alignment relative to the vehicle, before the interconnecting operation is started.

Similar to the guiding device, the alignment device advantageously comprises two vertically extending rod-like aligning members; and the guiding block comprises an aligning opening for each of the alignment members, each of these alignment openings having a funnel-shaped inlet followed by a substantially cylindrical portion. In a preferred embodiment, the guide openings and the aligning openings are formed by two through-holes vertically extending through the guiding block, so that only one pair of openings is required in the guiding block.

According to a further aspect of the invention, the second connector includes a protection cover, which is advantageously spring-biased into a closed position, wherein its opening is triggered by the first guiding device sliding by gravity along the second guiding device into the contact position. This protection cover efficiently protects the second connector against splashed water and accidental contact (risk of electrocution or short-circuiting) prior to interconnection with the first connector.

In a preferred embodiment, a spring is associated with the protection cover so as to urge it into a closed position, and a lever arm is associated with the protection cover so as cooperate with the guiding device for opening the protection cover.

The protection cover is advantageously formed by two opposing half-covers, pivotable about two parallel, substantially horizontal axes located on two opposite sides of the second connector part, one half-cover partially overlapping the other half-cover. It will be appreciated that using two opposing half-covers ensures a better splashed water and contact protection than would a single cover.

According to a further aspect of the invention, the upper part of the guide block forms at least one curved guide surface for guiding the power cable when a horizontal force component is exerted on the power cable; and the second guiding device and the second connector part are mounted in a casing which advantageously forms at its outlet a fixed curved guide surface in extension of the curved guide surface formed by the upper part the guide block. Working with a curved guide surface formed partially by the guide block and partially by a casing containing the second guiding device ensures a very efficient guiding of the power cable form a substantially vertical direction at the outlet of the first connector to a substantially horizontal direction at the outlet of the casing containing the second guiding device.

In an embodiment with improved safety: the first connector part includes two short-circuited pilot contact elements; a normally open circuit breaker is interconnected between the electric power supply and power mains; an open control circuit is associated with the circuit breaker to trigger a closing of the latter when closed itself; and the two short-circuited pilot contact elements close the open control circuit when the first connector part and the second connector part interconnect, thereby triggering a closing of the normally open circuit breaker. With this fail-safe system, the second connector part is only energized after interconnection with the first connector part, and is automatically disconnected from the mains as soon as the first and second connector are disconnected. Such a fail-safe system further improves protection against electrocution or short-circuits, which could, for example, be caused by accidentally contacting the second connector with an electricity-conducting object.

If required, the electric power cable may also include, for example, one or more data transmission lines, in particular a fibre optic line, and/or a compressed air supply line and/or a gas supply line.

It will be noted that the proposed devices have been specifically developed for a RTG crane, but may also be used for automatically connecting any other vehicle to an electric power supply, wherein the wording "vehicle" may also designate a ship or an aeroplane.

BRIEF DESCRIPTION OF DRAWINGS

The afore-described and other features, aspects and advantages of the invention will be better understood with regard to the following description of several embodiments of the invention and upon reference to the attached drawings, wherein:

FIG. 3A: is a sectional view of a device in accordance with the present invention, wherein the section plane is a vertical plane parallel to the travelling direction of the RTG crane along a travelling lane, the RTG crane is shown parked in the connecting position, and a first guiding device with a first connector part is shown in a parking station on the RTG crane;

FIG. 3B: is a sectional view of the device as shown in FIG. 3A, wherein the section plane is a vertical plane perpendicular to the travelling direction of the RTG crane;

FIG. 4A: is a sectional view of the device as shown in FIG. 3A, wherein the first guiding device with the first connector part is shown in a position in which it has already engaged a cooperating second guiding device associated with a mating second connector part;

FIG. 4B: is a sectional view of the device as shown in FIG. 4A, wherein the section plane is a vertical plane perpendicular to the travelling direction of the RTG crane;

FIG. 5A: is a sectional view of the device as shown in FIG. 3A, wherein the first guiding device with the first connector part is shown in a position in which the first connector part is close to connecting to the second connector part;

FIG. 5B: is a sectional view of the device as shown in FIG. 5A, wherein the section plane is a vertical plane perpendicular to the travelling direction of the RTG crane;

FIG. 6A: is a sectional view of the device as shown in FIG. 3A, wherein the first guiding device with the first connector part is shown in a position in which the first connector part is connected to the second connector part, and the RTG crane, now connected to the power supply line, has travelled out of the connecting position;

FIG. 6B: is a sectional view of the device as shown in FIG. 6A, wherein the section plane is a vertical plane perpendicular to the travelling direction of the RTG crane;

DETAILED DESCRIPTION OF AN EMBODIMENT OF THE INVENTION

It will be understood that the following description and the drawings to which it refers describe by way of example embodiments of the claimed subject matter for illustration purposes. They shall not limit the scope, nature or spirit of the claimed subject matter.

Figure 1:
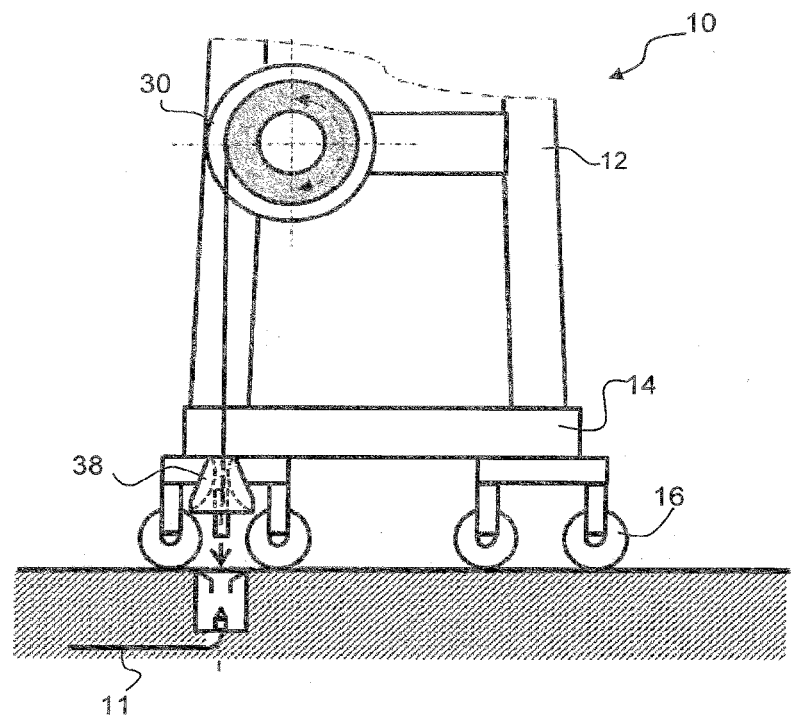
FIG. 1: is a schematic elevation view of a rubber tired gantry (RTG) crane, wherein the upper hoist part of the crane, which is not affected by the present invention, is not shown.

FIG. 1 schematically shows as a rubber tired gantry (RTG) crane 10 as a general illustration of a vehicle that can be connected to a fixed electric power supply line 11 by means of a device in accordance with the present invention.

The RTG crane 10 comprises a frame bridge 12, which supports hoisting equipment (not shown in the drawing). The frame bridge 12 is supported itself by a mobile platform 14, with wheels equipped with rubber tires 16 (i.e. the crane may travel on any flat surface and is not bound to a railway line).

Figure 2:
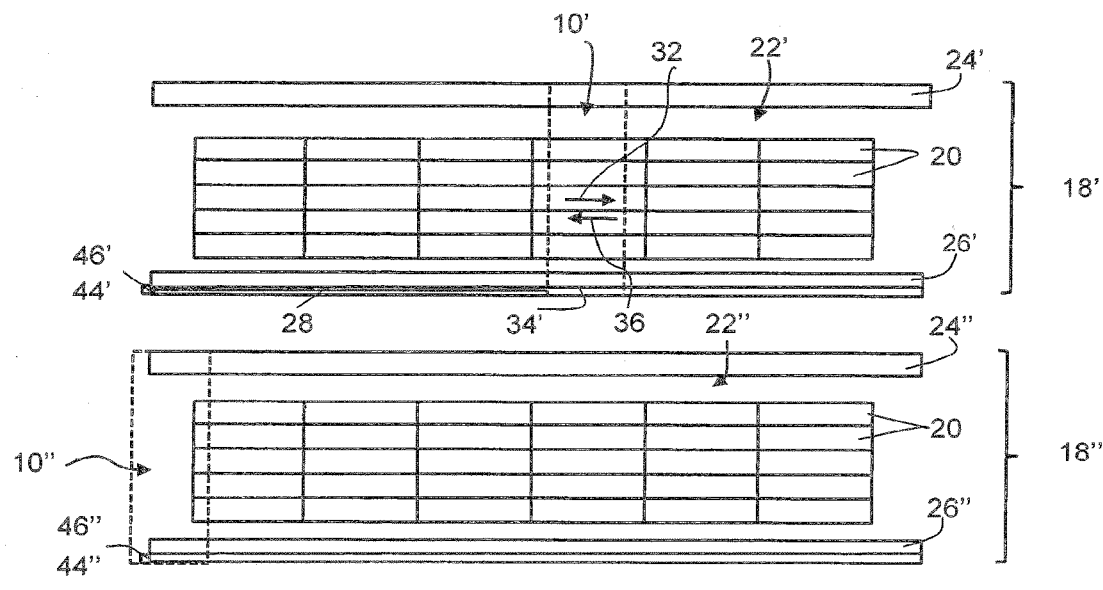
FIG. 2: is a schematic plane view of a container yard showing two parallel travelling lanes of an RTG crane equipped with a device in accordance with the invention, wherein the RTG crane is shown travelling along the first lane and parked in a connecting position of the second lane.

As illustrated in FIG. 2, the RTG crane (here schematically represented by a dashed rectangle 10' in a first position and a dashed rectangle 10" in a second position) is conceived more particularly for stacking freight containers 20 in stacking areas 22', 22" of a container terminal. To service the stacking area 22', the rubber tired wheels 16 of the RTG crane 10 run on a pair of runways 24', 26', bordering the stacking area 22' and forming a first lane 18'. To service the stacking areas 22", the rubber tired wheels 16 of the RTG crane 10 run on a pair of runways 24", 26", bordering the stacking area 22" and forming a second lane 18". Travelling along the lane 18' or 18", the RTG crane 10 is capable of straddling a container 20 in the respective stacking area 22' or 22", of lifting it, and of transporting it along the lane 18' or 18". In FIG. 2, the dashed rectangle 10' represents the RTG crane 10 in a travelling position on the lane 18'. The dashed rectangle 10" represents the RTG crane 10 parked in a so-called connecting position of the lane 18".

Electrical power is required to operate the RTG crane 10 along lane 18' and 18". The RTG crane 10 of FIG. 1 receives this electrical power through a power cable 28. It will be noted that the electric power is generally provided at a high voltage, which allows reducing the current and thereby the section of the power cable 28. For example, electric power for an RTG crane is typically provided as an alternating current (AC) with a voltage in a range from about 1000 V to about 6000 V.

On the RTG crane 10, the cable 28 is stored on a cable reel 30 (or a cable winch) mounted on one side of the frame bridge 12. As the crane travels along the lane 18' in the direction of arrow 32, the power cable 28 is unwound from the cable reel 30 (which is normally subjected to a controlled braking torque during this unwinding operation). To avoid damaging the power cable 28 on the runways 26', the power cable 28 is advantageously placed in a trench 34' extending along the runway 26' (respectively in a trench 34" extending along the runway 26", as the crane travels along a lane 18"). As the crane travels in the direction of arrow 36, the cable reel 30 winds the power cable 28 up, thereby drawing it out of the trench 34' (during this winding operation, the cable reel is driven by a motor, wherein the driving torque is controlled to limit tensile stress in the power cable 28). When the RTG crane 10 travels along the lane 18', the cable reel 30 is plumb-vertical to the trench 34', and when the RTG crane 10 travels along the lane 18", the cable reel 30 is plumb-vertical to the trench 34". Reference number 38 indicates a cable deflection device on the RTG crane 10. This cable deflection device 38 provides a curved guiding surface, which is advantageously defined by small rollers 40 arranged along a circular arc (see, for example, FIG. 3A), deviating the power cable 28, which pends vertically from the cable reel 30, in a substantially horizontal direction, when the RTG crane 10 travels along the lane 18'.

It remains to be noted that the trenches 34', 34" are advantageously covered with a cover belt, as disclosed e.g. in European patent EP 0 655 819. In this case the RTG crane 10 is further equipped with a belt lifting device (not shown) which engages the trench 34' and locally twists open the cover belt, thereby allowing the cable deflection device 38 to place the cable into the locally open trench.

To connect the cable 28 of the mobile RTG crane 10 to the fixed electric power supply line 11, the free end of the cable 28 is equipped with a first connector part 42 and the power supply line 11 is connected to a mating second connector part 44. The latter is arranged in a connection pit 46, so that the first connector part 42 is connectable to the second connector part 44 according to a substantially vertical direction. The connector parts 42 and 44 usually have four mating contact elements (not shown), i.e. one contact element for each power phase and one contact element for the earth. Additionally, the connector parts 42, 44 may further include a pair of pilot contact elements, which detect that both connector parts have properly mated. If the cable 8 includes a data transmission line, a fibre optic line or a compressed air line, the connector parts 42 and 44 must of course comprise suitable connector elements for such lines. The contact or connector elements may mate according to distinct parallel interconnection axes (this is, for example, the case for a plug comprising several parallel contact pins) or mate with axial symmetry along a common axis of interconnection (this is, for example, the case for a plug comprising a cylindrical pin with axially spaced annular contact sections). In the first case, for mating the connector parts 42 and 44, the connection axes of all the contact elements of the first connector part 42 must be brought into alignment with the connection axes of the corresponding contact elements of the second connector part 44; i.e. the angular orientations of the two connector parts 42, 44 in a plane perpendicular to the direction of interconnection must coincide to achieve the interconnection. In the second case, it will basically be sufficient to align the common connection axis of the contact elements of the first connector part 42 with the common connection axis of the contact elements of the second connector part 44, to achieve a proper interconnection of the connector parts 42 and 46, i.e. the angular orientation of the two connector parts 42, 44 in a plane perpendicular to the direction of interconnection is basically of no importance.

As seen in FIG. 2, each of the two trenches 34', 34" has its own connection pit 46', 46" with a second connector part 44', 44" therein. If the RTG crane 10 has to operate along lane 18', the first (mobile) connector part 42 of the cable 28 is connected to the second (fixed) connector part 44' in the connection pit 46' associated with the lane 18'. However, if the RTG crane 10 has to operate along lane 18", the first (mobile) connector part 42 of the cable 28 has to be connected to the second connector part 44" in the connection pit 46" associated with the lane 18". (For driving from one lane 18' to the other lane 18", the RTG crane 10 is usually equipped with a Diesel generator.)

It will be appreciated that manually disconnecting the first connector part 42 from the second (fixed) connector part 44' in the connection pit 46' and then manually reconnecting it to the second (fixed) connector part 44" in the connection pit 46", are not only time consuming and cumbersome operations for a crane operator. Because of safety hazards associated with high voltage, they are also very dangerous operations. Therefore, it will be highly appreciated that the present invention proposes very simple but efficient devices for making such manual disconnecting and reconnecting operations superfluous.

FIGS. 3 to 6 illustrate the basic structure of an embodiment of such a device, as well as the process for connecting the first connector part 42 provided at the free end of the cable 28 to the mating second connector part 44 connected to the power line 11.

It will first be noted that the process of connecting the first connector part 42 to the second connector part 44 (as well as the disconnecting process) takes place when the RTG crane 10 is parked in the afore-mentioned connecting position shown in FIG. 2 with the dashed rectangle 10" in lane 18". In this connecting position of the RTG crane 10, the first connector part 42 (which has, as described below, a predefined position and orientation on the RTG crane 10) must be aligned with the mating second (fixed) connector part 44 so that their connection can be achieved just by moving the first (mobile) connector part 42 according to a substantially vertical direction towards the second (fixed) connector part 44. If the contact elements of the two connector parts 42, 44 mate according to distinct parallel interconnection axes, this means that the connection axes of a pair of mating contacts and the angular orientations of the two connector parts 42, 44 in a plane perpendicular to the direction of interconnection must coincide within predefined alignment tolerances. If all the contact elements of the two connector parts 42, 44 mate with axial symmetry along a common axis of interconnection, it will be sufficient that the common connection axis of the contact elements of the first connector part 42 coincides within predefined alignment tolerances with the common connection axis of the contact elements of the second connector part 44.

To achieve an accurate positioning of the RTG crane 10 in the connecting position, a suitable position control device is preferably used. Such a position control device (not shown in the drawings) may, for example, comprise one or more cameras mounted on the RTG crane 10. Bringing a visor frame movable with the RTG crane 10 in the camera image in accord with fixed position markers, provided, for example, on the floor around or near the connection pit 46 or on a fixed structure in or near the connection pit 46, the crane operator can accurately align the RTG crane 10 within acceptable alignment tolerances in the connecting position. Acceptable alignment tolerances are alignment deviations that can still be automatically compensated by the proposed device, as will be discussed below.

Referring now more particularly to FIGS. 3A, 3B, 4A and 4B, the main components of a device in accordance with the invention will be described. It will first be noted that the device basically consists of a mobile unit 48 borne by the RTG crane 10 (also called "turn-over-anchor") and a fixed unit 50 (also called "docking station") installed in each connection pit 46.

The mobile unit 48 basically comprises the first connector part 42 and, associated therewith, a first guiding device 52. The fixed unit 50 basically comprises the second connector part 44 and, associated therewith, a second guiding device 56 complementary to the first guiding device 52. The first and second guiding devices 52, 56 are designed so that, when the RTG crane 10 is properly aligned in the aforementioned connecting position, and the power cable 28 is unwound from the cable reel 30, the first guiding device 52 is capable of engaging the second guiding device 56 and of sliding by gravity along the second guiding device 56, which guides it into a contact position, in which the first connector part 42 mates with the second connector part 44 and their contact elements establish electrical contact.

The second guiding device 56 advantageously comprises two vertical, upwardly extending, rod-like guide members 58', 58", which are arranged in the connection pit 46 on both sides of the second connector part 44, wherein the central axis of the second connector part 44 and the two rod-like guide members 58', 58" are advantageously contained in a plane perpendicular to the travelling direction of the RTG crane. As can be seen in FIG. 3B, the rod-like guide members 58', 58" have tip ends 59', 59" protruding out of the connection pit 46. In the aforementioned positioning camera image, these protruding tip ends 59', 59" can, for example, be used as fixed markers for positioning the RTG crane 10 in the connecting position.

As shown in FIG. 3B, the complementary first guiding device 52 comprises a guiding block 60 with a guide opening 62', 62" for each of said guide members 58', 58". The cross-sections of guide members 58', 58" and the guide openings 62', 62" are designed so that the guiding block 60 is capable of sliding by gravity along the guide members 58', 58" into the final contact position. It will be noted that each of the guide openings 62', 62" has, in the bottom side of the guiding block 60, a funnel-shaped inlet 64', 64". The latter cooperates with the preferably conical tip ends 59', 59" of the rod-like guide members 58', 58" for guiding the latter into a substantially cylindrical portion 66', 66", thus warranting a self-alignment of the guiding block 60 on the guide members 58', 58". Consequently, the opening diameter of the funnel-shaped inlet 64', 64" determines the acceptable alignment tolerances. The radial play between the cylindrical part of guide member 58', 58" and the cylindrical portion 66', 66" of the guide opening 62', 62" shall be: (1) sufficiently big to still warrant a smooth sliding of the guiding block 60 into the final contact position; and (2) sufficiently small to warrant the alignment precision required for achieving a proper interconnection in the final contact position of the first connector part 42 and the second connector part 44.

Referring now to FIG. 4B, it will be noted that the guide openings 62', 62" are preferably through-openings extending from the bottom side of the guiding block 60 into its top surface, wherein each of them forms a funnel-shaped inlet 68', 68", similar to the funnel-shaped inlets 64', 64" in the bottom surface. The so-called parking station 54 of the turn-over-anchor 48 is formed on the cable deflecting device 38 and comprises two vertical, downwardly extending, rod-like aligning members 70', 70". These aligning members 70', 70" are received in the guide openings 62', 62" through the upper funnel-shaped inlets 68', 68" (see FIG. 3B). The aligning members 70', 70" of the parking station 54 and the guide openings 62', 62" of the guiding block 60 cooperate to align the guiding block 60 in a pre-set angular position on the RTG crane 10. When, as shown in FIGS. 3A and 3B, the guiding block 60 is lowered by unwinding the power cable 28 from the cable reel 30, the aligning members 70', 70" of the parking station 54 guide the guiding block 60 until the fixed guide members 58', 58" engage the lower funnel-shaped inlets 64', 64" of the guide openings 62', 62'. Thus, a misalignment due to a pendulum or rotational movement of the power cable 28, as the guiding block 60 quits the aligning members 70', 70", is efficiently prevented. Structurally speaking, this means that the vertical distance between the tip ends of the guide members 58', 58" and the alignment members 70', 70" shall be slightly smaller than the distance between the lower inlet section of the funnel-shaped inlets 64', 64" and the upper inlet section of the funnel-shaped inlets 68', 68".

The first connector part 42 is housed in a cavity 72 of the guiding block 60, which has only an opening in the bottom side of the guiding block 60. It is much shorter than the depth of the cavity 72 and located towards the rear end of the latter, so that its head 43 with the contact elements therein is well protected within this cavity 72 of the guiding block 60.

In FIGS. 4A and 4B, the guiding block 60 is shown sliding along the guide members 58', 58" as the power cable 28 is unwound from the cable reel 30. It will be noted that the head 45 of the second connector part 44 is in this position still protected by a protection cover 74, the opening of which will only be triggered when the guiding block 60 is close to the contact position.

In FIGS. 5A and 5B, the guiding block 60 is shown in a position shortly before engaging an opening mechanism of the protection cover 74. This opening mechanism and the protection cover 74 will now be described in greater detail with reference to FIG. 7 and FIG. 8.

Figure 7:
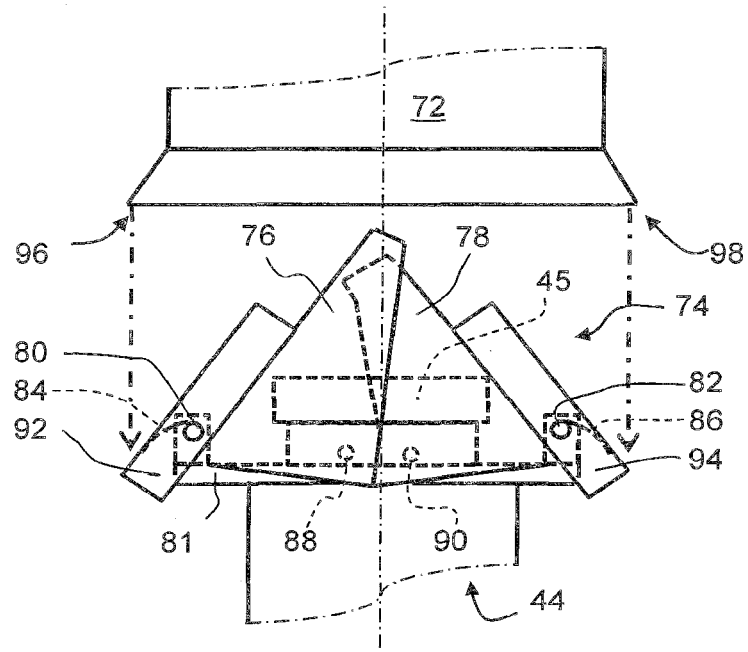
FIG. 7: is an enlarged sectional view, substantially as in FIG. 4A, showing in greater detail a two-part protection cover for the second connector part, wherein the first guiding device is close to engaging an opening mechanism of the two-part protection cover.

In FIG. 7 the protection cover 74 is shown in its closed position. It advantageously comprises two opposing half-covers 76, 78, which cooperate to protect the head 45 of the second connector part 44. The first half-cover 76 is pivotable about a substantially horizontal axis 80 arranged on a collar 81 of the connector part 44, just under its head 45. The cooperating second half-cover 78 is pivotable about a substantially horizontal axis 82, which is parallel to the axis 80 and located on the same collar 82, on the opposite side of the second connector part 44. Each pivotable half-cover 76, 78 is urged by a spring 84, 86 in the closed position shown in FIG. 7, wherein each half-cover 76, 78 rests with a mechanical stop 88, 90 on an abutment surface of the second connector part 44. In this closed position, the first half-cover 76 partially overlaps the second half cover 78, as well on the top side as laterally on both sides, i.e. both half-covers 76, 78 cooperate among themselves and with the collar 82 to fully enclose the head 45 of the connector part 44, thereby preventing rain and splash water from penetrating therein. Seals arranged on the half-covers 76, 78 and the collar 82, will further improve protection of the head 45 of the connector part 44 against rain and splash water.

For opening the half-covers 76, 78, the latter are equipped with levers 88, 90. As the guiding block 60 engages the second connector part 44 and moves further downwards, a lower rim portion 96, 98 of the guiding block 60 pushes onto the vertically juxtaposed free end of the lever 88, 90 to pivot the corresponding half-cover 76, 78 in its open position. It will be noted that when the rim portions 96, 98 come into contact with the levers 88, 90, the head 45 of the second connector part 44 is already engaged in the cavity 72 in the guiding block 60, wherein it is well protected against splash water.

Figure 8:
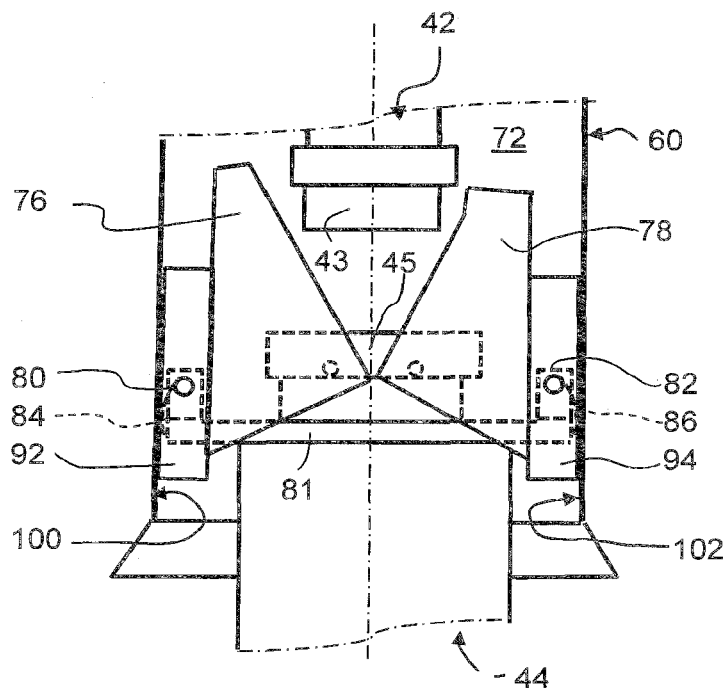
FIG. 8: is an enlarged sectional view, substantially as in FIG. 5A, showing the two-part protection cover for the second connector part after the first guiding device has engaged the opening mechanism of the two-part protection cover.

In FIG. 8 both half-covers 76 and 78 are shown in their fully open position, when the second connector part 44 is already in a protected position within the cavity 72 of the guiding block 60. In this open position, the corresponding lever 92, 98 of the half-cover 76, 78 is urged by the associated spring 84, 86 against an interior vertical wall 100, 102, which delimits the cavity 72 in the guiding block 60. The head 45 of the second connector part 44 is now freely accessible between the open half-covers 76, 78 for interconnecting within the protected cavity 72 with the first connector part 42.

In FIGS. 6A and 6B, the guiding block 60 is shown in a position in which the first connector part 42 has interconnected with the second connector part 44 and the RTG crane 10 has left the connecting position. In FIG. 6A it is seen that the upper part of the guide block 60 forms two oppositely curved first guide surfaces 104, 106 for guiding the cable when a horizontal force component is exerted thereon, either in the direction of arrow 104' or of arrow 106'. Each of these first curved guide surfaces 104, 106 is advantageously extended by a fixed curved guide surface 108, 110, which is, for example, formed at the outlet of a metallic casing 112, in which the second guiding device 56 and the second connector part 44 are mounted.

Figure 9:
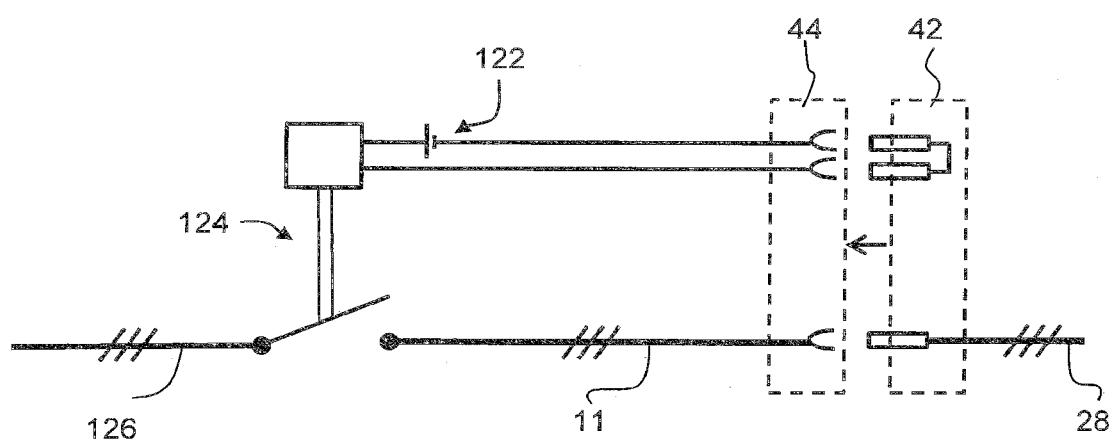
FIG. 9: is simplified diagram illustrating a preferred electrical circuitry for a device in accordance with the invention.

Referring now to FIG. 9, it will be noted that the first connector part 42 advantageously includes two pilot contact elements 120 that are short-circuited within the first connector part 42. As the first connector part 42 interconnects with the second connector part 44, these short-circuited pilot contact elements 120 close a control circuit 122 of a normally open circuit breaker 124, which is interconnected between the fixed electric power supply line 11 and the power mains 126. Upon closing of its control circuit 122, the normally open circuit breaker 124 closes and connects the fixed electric power supply line 11 to the power mains 126. It follows that the second connector part 44 is only set under tension after proper interconnection with the first connector part 42, which takes place within the cavity 72 of guiding block 60, i.e. within an enclosed environment. Similarly, as the first connector part 42 is withdrawn from the second connector part 44, the control circuit 122 is opened, which opens the circuit breaker 124 and immediately interrupts electric power supply from the power mains 126 to the fixed electric power supply line 11. Thus, the second connector part 44 is already de-energized before the upwardly moving guiding block 60 uncovers it in the connection pit 46.

A further embodiment of a device for automatically connecting a vehicle, in particular a mobile gantry crane, via a cable to an electric power supply, will now be described with reference to FIG. 10 to FIG. 20.

This device comprises three main parts: (1) a turn-over-anchor 210 as shown e.g. in FIGS. 10 and 12; (2) a docking station 212, as shown e.g. in FIG. 11; and (3) a transfer arm 214, as shown e.g. in FIG. 13.

The turn-over-anchor 210 includes a first connector part 216 connected to a first end of a cable 208. The other end of this cable 208 is normally connected to an electric circuit (not shown) on the vehicle to be supplied with electric energy. In addition to electrical conductors, such a cable may further comprise a fibre optic line and/or other data transmission lines. The electrical connection of the cable 208 to first connector part 216 is preferably arranged in a closed junction box 218, having an adequate protection class. In the junction box 218 is also housed a cable anchorage for traction relief of the electrical connection of the cable 208 to first connector part 216.

The turn-over-anchor 210 includes a support frame 220, in which a cable drum 222 is arranged behind the first connector part 216 and the junction box 218, wherein the first connector part 216 is arranged near the centre of the cable drum 222. The cable drum 222 is rigidly fixed to the support frame 220. It only fulfils a cable guiding function for the cable end and is generally not used for winding thereon more than one cable loop. The cable 208 leaves the junction box 218 through a cable outlet 224 in the upper half of the cable drum 222 and is first guided downwardly under the cable drum 222. It is then guided at least partly around the cable drum 222, to leave the turn-over-anchor 210 either at a first location 226 to the right, after having been guided by about 180° around the cable drum 222, or at a second location 228 to the left, after having being guided by about 360° around the cable drum 222. The arrows 229 and 229' in FIG. 10 indicate typical pulling forces exerted onto the cable 208 leaving the cable drum 222 either at the first location 226 or at the second location 228.

Figure 11:
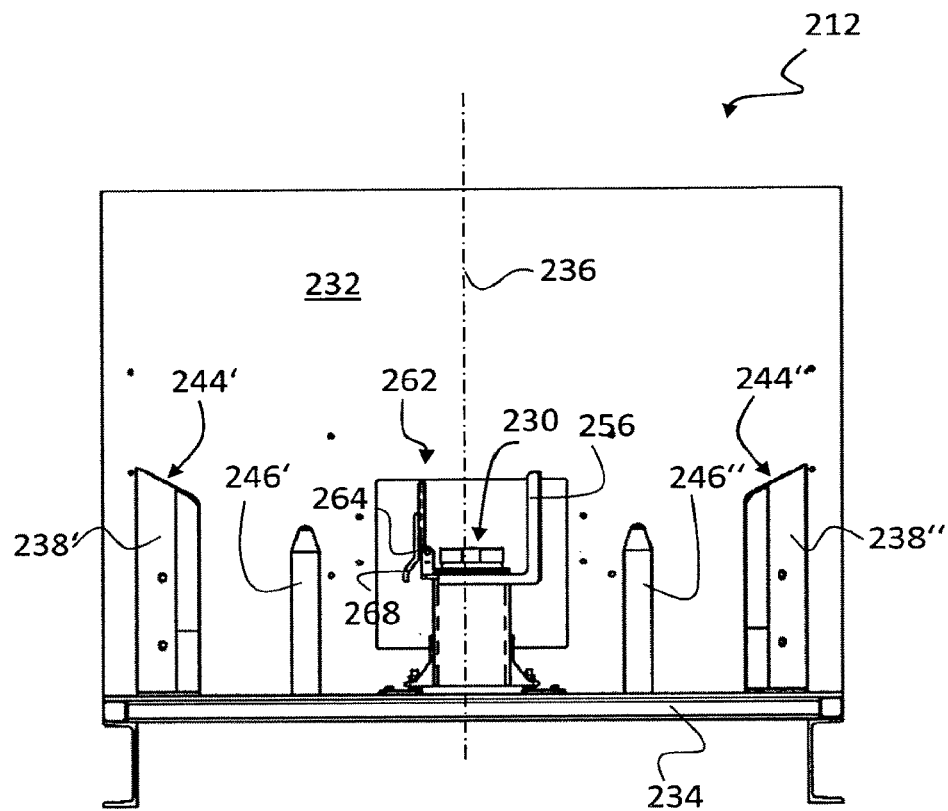
FIG. 11: is a front view of a docking station for the turn-over-anchor shown in FIG. 10.

As can be seen on FIG. 11, the docking station 212 includes a second connector part 230, which is normally connected to an electric power supply (not shown). The connector parts 216 and 230 may be interconnected by axially plugging them together. Each connector part 216, 230 usually has four mating contact elements (not shown), i.e. one contact element for each power phase and one contact element for the earth. Additionally, the connector parts 216, 230 may further include a couple of pilot contact elements, which detect that both connector parts have properly mated. The contact elements either mate according to distinct parallel interconnection axes (this is e.g. the case for a male connector part comprising several parallel contact pins) or they mate axially along a common axis of interconnection (this is e.g. the case for a male connector part comprising a cylindrical pin with axially spaced annular contact sections). If the cable 208 includes a fibre optic line, the connector parts 216 and 230 must further comprise a fibre optic connector.

Still referring to FIG. 11, the docking station 212 further includes a vertical push-plate 232 and a horizontal base 234 supporting the vertical push-plate 232. As can be seen on FIG. 17, the push-plate 232 is higher than the turn-over-anchor 210. The second connector part 230 is vertically supported on the horizontal base 234 in front of the push-plate 232.

Reference number 236 in FIG. 11 identifies a vertical coupling axis 236. Along this vertical coupling axis 236, the first connector part 216 mates with the second connector part 230, when the turn-over-anchor 210 is vertically deposited into the docking station 212. Reference number 236' in FIG. 10 identifies a corresponding coupling axis of the first connector part 216.

Figure 10:
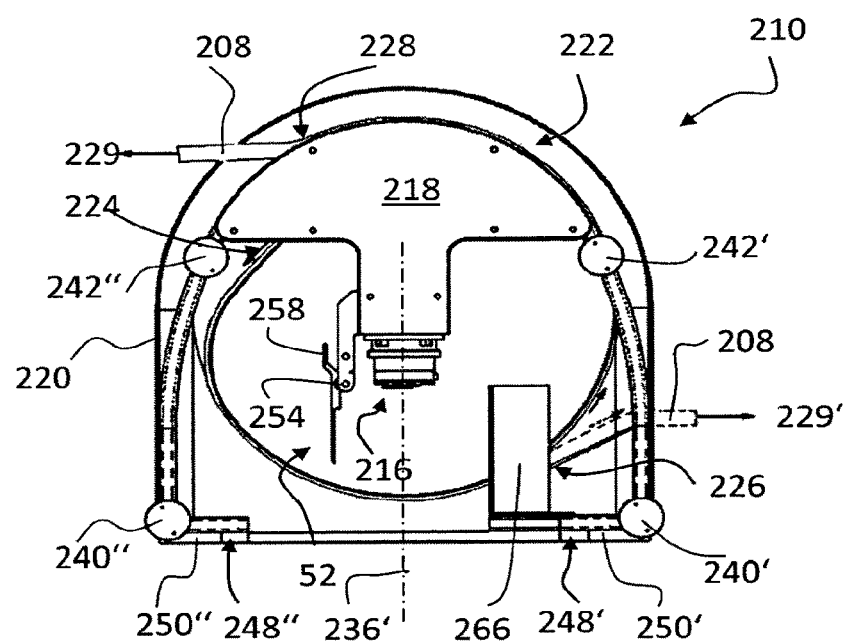
FIG. 10: is a front view of a turn-over-anchor of a further device in accordance with the invention.
Figure 12:
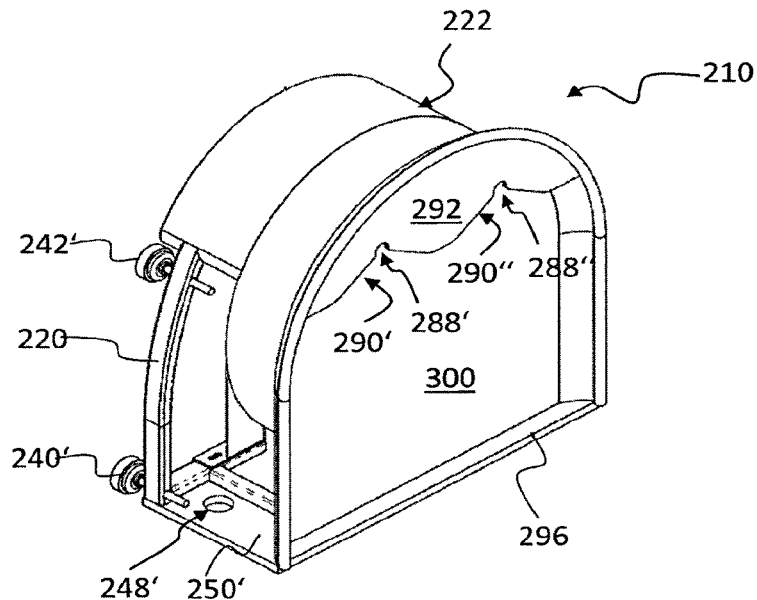
FIG. 12: is a three-dimensional view of the turn-over-anchor shown in FIG. 10, the view showing the rear side of turn-over-anchor.

FIGS. 10 and 12 show that the turn-over-anchor 210 further comprises adjustable lower and upper spacer elements 240', 240", 242', 242" protruding from its front face. These spacer elements 240', 240", 242', 242" can be adjusted so that when the turn-over-anchor 210 is pushed with these spacer elements 240', 240", 242', 242" against the vertical push-plate 232, the axes of the first connector part 216 and the second connector part 230 are both located in a plane parallel to the vertical push-plate 232. Each of these spacer elements 240', 240", 242', 242" advantageously includes in its front face a rolling ball (not shown) as a contact element for the vertical push-plate 232.

The lower spacer elements 240', 240", which are laterally protruding out of the turn-over-anchor 210, are moreover configured as cylindrical guide rolls for interacting with lateral guides 238', 238" in the docking station 212. Alternatively, the turn-over-anchor 210 may also comprise separate guide elements for interacting with lateral guides 238', 238" in the docking station 212. The lateral guides 238', 238" are vertically supported on the horizontal base 234 in front of the push-plate 232 and are symmetrical with regard to a plane passing through the vertical coupling axis 236 and perpendicular to the push-plate 232 (see FIG. 11). The top surfaces 244', 244" of these lateral guides 238', 238" define a funnel shaped inlet opening for the turn-over-anchor 210, which is configured for substantially aligning the axes of the first connector part 216 and the second connector part 230 in a plane parallel to the vertical push-plate 232. Alternatively, the turn-over-anchor 210 may also comprise inclined lateral guide surface interacting with guide rollers in the docking station, both configured for substantially aligning the axes of the first connector part 216 and the second connector part 230 in a plane parallel to the vertical push-plate 232.

Reference numbers 246', 246" identify two horizontally spaced vertical rods arranged on the horizontal base 234 symmetrically with regard to a plane passing through the vertical coupling axis 236 and perpendicular to the push-plate 232 (see FIG. 11). Each of these very rigid cylindrical rods 246', 246" vertically penetrates into a hole 248', 248" in a base plate 250', 250" of the turn-over-anchor 210 (see FIG. 11 and FIG. 12), when the turn-over-anchor 210 is deposited into the docking station 212. It will be appreciated that these vertical rods 246', 246" are dimensioned so as to be self-locking in the holes 248', 248", if the turn-over-anchor 210 is subjected to a significant force that is not aligned with the vertical coupling axis 236. As will be explained in more details hereinafter, the self-locking function of the vertical rods 246', 246" in the holes 248', 248" renders superfluous any additional mechanism for locking the turn-over-anchor 210 in the docking station 212. This is in particular true if the turn-over-anchor 210 is equipped with the cable drum 222, which warrants that pulling forces exerted by the cable 208 onto the turn-over-anchor 210 will never be aligned with the vertical coupling axis 236 (see FIG. 10).

FIG. 11 shows that the top surfaces 244', 244" of the lateral guides 238', 238" are located above the tips of the vertical rods 246', 246". It follows that the turn-over-anchor 210 will first engage with its lower spacer elements 240', 240" the guiding top surfaces 244', 244" of the lateral guides 238', 238", before the vertical rods 246', 246" penetrate into the holes 248', 248" in the base plates 250', 250" of the turn-over-anchor 210. This warrants that the turn-over-anchor 210 is already centred within the docking station 212 before the vertical rods 246', 246" have to penetrate into the holes 248', 248" in the base plates 250', 250" of the turn-over-anchor 210. Furthermore, the vertical rods 246', 246" are slightly higher than the second connector part 230. It follows that the vertical rods 246', 246" will first penetrate into the holes 248', 248" in the base-plates 250', 250" of the turn-over-anchor 210 before the turn-over-anchor 210 comes close to the second connector part 230. This warrants that the second connector part 230 cannot be damaged by the turn-over-anchor 210 deposited into the docking station 212.

Each of the holes 248', 248" in the base plates 250', 250" of the turn-over-anchor 210 advantageously includes a funnel-shaped inlet (not shown in the drawings) followed by a substantially cylindrical portion. When the turn-over-anchor 210 is lowered into the docking station 212, the funnel shaped inlet of the hole 248', 248" cooperates with a tip of the rod 246', 246" to guide the rod 246', 246" into the substantially cylindrical portion of the hole 248', 248". Thereafter the substantially cylindrical portion of the hole 248', 248" cooperates with the cylindrical shaft of the rod 246', 246" to guide the turn-over-anchor 210 with the required accuracy into a position wherein the first connector part 216 mates without problem with the second connector part 230. This auto-centring function provided by the rods 246', 246" cooperating with the funnel shaped holes 248', 248" advantageously warrants an additional fine-centring of the turn-over-anchor 210, after the latter has already been roughly centred by the lower spacer elements 240', 240" cooperating with the lateral guides 238', 238". It remains to be noted that if the entrance opening of the funnel shaped holes 248', 248" is sufficiently large, one may also do without the aligning function provided by the lower spacer elements 240', 240", which cooperate with the lateral guides 238', 238". Finally, the second connector part 230 is advantageously mounted on one or more springs, so as to allow for some angular and/or alignment adjustability/flexibility, when the two connector parts 216, 230 interconnect.

Reference number 252 in FIG. 10 shows a protection cover for the first connector part 216 in its open position. This protection cover 252 is pivotable about a horizontal pivoting axis 254 between a closed position (not shown), in which it covers the first connector part 216, and an open position (shown in FIG. 10), in which it uncovers the first connector part 216 for mating with the second connector part 230. A closing spring (not shown) exerts onto the protection cover 252 a closing moment urging the latter into its closed position. When the turn-over-anchor 210 is deposited into the docking station 212, a pusher element 256, which is e.g. arranged on the horizontal base 234 of the docking station 212 (see FIG. 11), cooperates with a lever arm 258, which extends from the protection cover 252, for pivoting the protection cover 252 into its open position shown in FIG. 10, opposing hereby the closing moment of the closing spring. In a less preferred embodiment (not shown), the closing spring is replaced by a counter-weight arranged so as to apply a closing moment onto the protection cover 252. In a further less preferred embodiment (not shown), the closing spring is replaced by an electrically or pneumatically operated piston.

Similarly, reference number 262 in FIG. 10 shows a protection cover for the second connector part 230 in its open position. This protection cover 262 is pivotable about a horizontal pivoting axis 264 between a closed position (not shown), in which it covers the second connector part 230, and an open position (shown in FIG. 11), in which it uncovers the second connector part 230 for mating with the first connector part 216. A closing spring (not shown) exerts onto the protection cover 262 a closing moment urging the latter into its closed position. When the turn-over-anchor 210 is deposited into the docking station 212, a pusher element 266, which is arranged on a base plate 250" of the turn-over-anchor 210 (see FIG. 10), cooperates with a lever arm 268 extending from the protection cover 262 for pivoting the latter its open position shown in FIG. 10, opposing hereby the closing moment of the closing spring. In a less preferred embodiment (not shown), the closing spring is replaced by a counter-weight arranged so as to apply a closing moment onto the protection cover 262. In a further less preferred embodiment (not shown), the closing spring is replaced by an electrically or pneumatically operated piston.

For vertically lowering the turn-over-anchor 210 into in the docking station 212 and for vertically lifting it out of the docking station 212, a vertical lifting device is used. The latter is advantageously part of a transfer arm 214, with three degrees of freedom for transferring the turn-over-anchor 210 into and out of the docking station 212.

Figure 13:
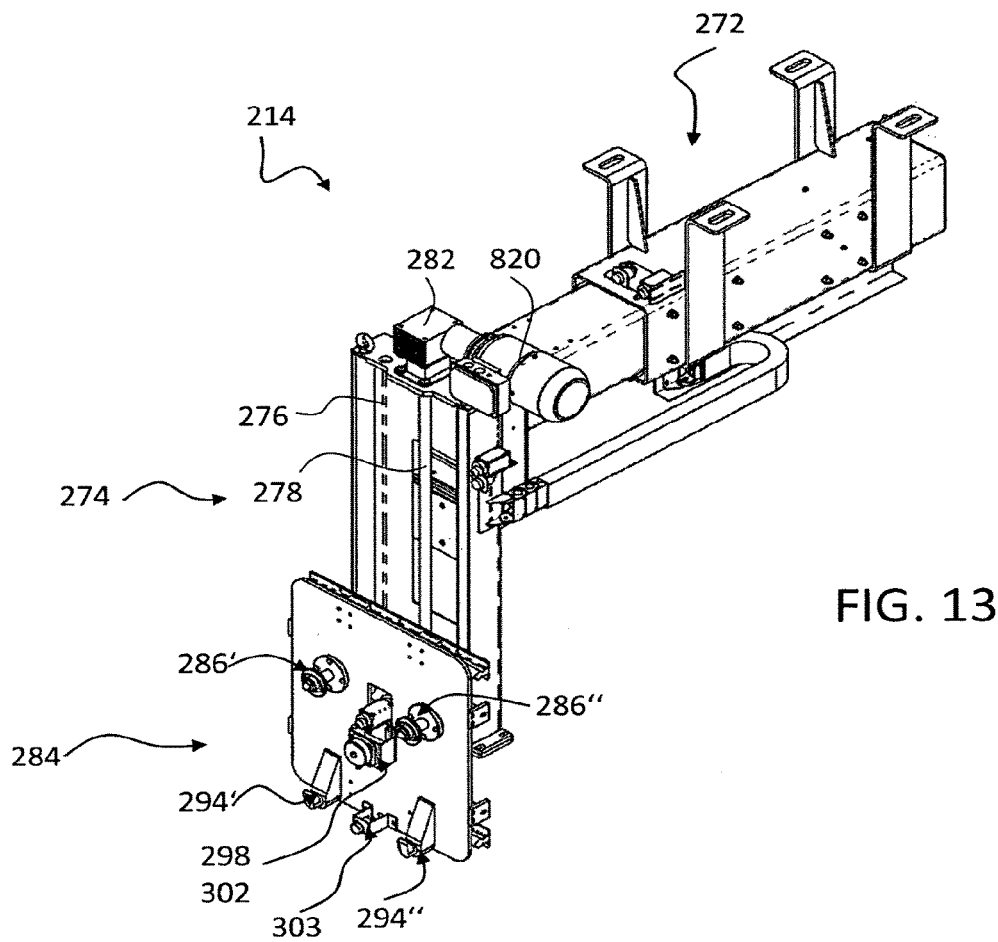
FIG. 13: is a three-dimensional view of a transfer arm for the turn-over-anchor shown in FIG. 10.

A preferred embodiment of such a transfer arm 214 is shown in FIG. 13. It includes an extendable arm section 272, which is advantageously conceived as a horizontal telescopic arm. The extendable arm section 272 is e.g. equipped with a linear actuator (such as e.g. a hydraulic, pneumatic or electric linear drive) or a linear drive mechanism (such as e.g. a spindle mechanism or a rack and pinion mechanism), which is advantageously arranged inside the telescopic arm 272 (and therefore not seen on FIG. 13).

A linear vertical lifting mechanism 274 is supported on the front end of the telescopic arm 272. Such a linear vertical lifting mechanism 274 advantageously comprises vertical guide rods or rails 276 and a low speed spindle drive 278 driven by an electric motor 280 equipped with an angular gear box 282. Instead of a telescopic arm 272, it is of course also possible to use a pivotable arm, in particular a parallelogram type arm, which warrants that the lifting mechanism 274 remains parallel to itself during the pivoting movement of the arm.

A third element of the transfer arm 214 is a so-called hook-plate 284, which is supported by the linear vertical lifting mechanism 274. This hook-plate 284 forms a dedicated parking station for the turn-over-anchor 210 and coupling device for coupling the vertical lifting mechanism 274 to the turn-over-anchor 210. It has a horizontal degree of freedom for floating, with regard to the linear vertical lifting mechanism 274, perpendicularly to a vertical plan containing the central axis of the extendable arm section 272. This degree of freedom enables guide means (comprising e.g.: the aforementioned lateral guides 238', 238" in the docking station 212 cooperating with the guide rolls 240', 240" arranged laterally on the turn-over-anchor 210; and/or the funnel-shaped inlets of the holes 246', 246" cooperating with the tips of the vertical rods 246', 246") to laterally align the turn-over-anchor 210 within the docking station 212, when the turn-over-anchor 210 is vertically deposited into the docking station 212. It will be noted that this additional degree of freedom has a spring-biased neutral centre position, which is advantageously configured so that a vertical plane containing the central axis of the extendable arm section 272 contains the vertical central axis of the first connector part 216, when the turn-over-anchor 210 is freely supported by the transfer arm 214.

The hook-plate 284 advantageously includes two horizontally spaced upper hook elements 286', 286". Each of these hook elements 286', 286" includes a cylindrical pin with a disk like head. These hook elements 286', 286" are capable of engaging vertical slots 288', 288" provided with funnel shaped inlet openings 290', 290", which are arranged in a rear support plate 292 on the rear side of the turn-over-anchor 210, near the top end of the latter (see FIG. 12). In a first embodiment, the hook-plate 284 further includes two horizontally spaced lower hook elements 294', 294", which are configured for engaging a lower rim 296 of the turn-over-anchor 210 near the bottom end of the latter (see FIG. 12). In this first embodiment, the upper hook elements 286', 286" provide two vertical lifting points for the turn-over-anchor 210, and the lower hook elements 294', 294" only secure its bottom against excessive pivoting. In a second embodiment, the lower hook elements 294', 294" are replaced by horizontal lower support elements (not shown). The latter are advantageously equipped with friction reducing pads, on which the turn-over-anchor 210 rests with the lower rim 296. In this alternative embodiment, the lower support elements 294', 294" provide two vertical lifting points for the turn-over-anchor 210, and the hook elements 286', 286" only secure its top against excessive tipping during transport. In both embodiments, the turn-over-anchor 210 can shift angularly with regard to the hook-plate 284, to align itself parallel to the push-plate 232, when the turn-over-anchor 210 is pushed against the push-plate 232. In the second embodiment, this alignment is facilitated by the friction reducing pads on which the turn-over-anchor 210 rests. A central stopper 298, is arranged on the hook-plate 284 centrally between the upper and lower support elements 286', 286" and 294', 294". It is configured as a central abutment surface for the rear wall 300 of the turn-over-anchor 210, when the transfer arm 214 pushes the turn-over-anchor 210 horizontally against the vertical push-plate 232 of the docking station 212. A horizontal load cell 302 is advantageously associated with this central buffer 298, to measure the pressure with which the transfer arm 214 pushes the turn-over-anchor 210 horizontally against the vertical push-plate 232. This load cell 302 may then be integrated into a control circuit of the actuator of the extendable arm section 272, to maintain the force with which the turn-over-anchor 210 is horizontally pushed against the vertical push-plate 232 within a predetermined range.

Figure 19:
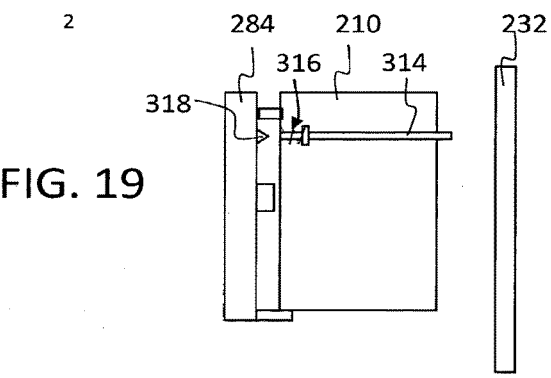
FIG. 19: is a schematic diagram illustrating the functioning of a switch extension device integrated into the turn-over-anchor, showing the turn-over-anchor before it is pushed against a push-plate of the docking station.
Figure 20:
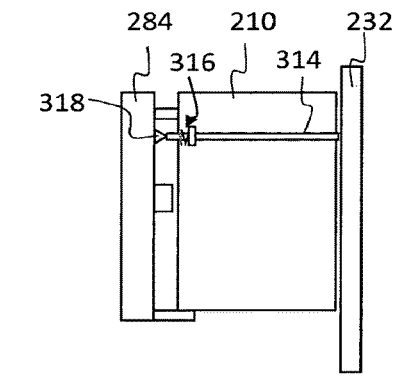
FIG. 20: is a schematic diagram as in FIG. 19, showing the turn-over-anchor pushed against the push-plate of the docking station.

FIG. 19 schematically illustrates a switch extension device 314, 316 integrated into the turn-over-anchor 210. This switch extension device 314, 316 cooperates with a switch 318 on the hook-plate 284, to stop the extension of the extendable arm section 272, when the turn-over-anchor 210 abuts against the vertical push-plate 232. The switch extension device mainly comprises a horizontal push rod 314 slidably mounted in the turn-over-anchor 210. A spring 316 urges this push rod 314 in the direction of the front face of the turn-over-anchor 210, wherein the front end of the push rod 314 protrudes out of this front face (see FIG. 19). When the turn-over-anchor 210 abuts against the vertical push-plate 232 (see FIG. 20), the latter pushes the push rod 314 in the direction of the rear face of the turn-over-anchor 210, acting hereby against the biasing force of the spring 316. Now the rear end of the push rod 314 protrudes out of the rear face of the turn-over-anchor 210 and actuates the switch 318 on the hook-plate 284, which stops the extension of the extendable arm section 272. If this switch extension device 314, 316 is used for stopping the extension of the extendable arm section 272, when the turn-over-anchor 210 is abuts against the vertical push-plate 232, the aforementioned horizontal load cell 302 is advantageously used as an additional safety feature, to prevent that excessive forces are exerted onto the vertical push-plate 232, if the switch 318 fails for example.

Normally, the transfer arm 214 is mounted on the vehicle, e.g. a RTG crane. In this case, the docking station 212 for the turn-over-anchor 210 is located along a driveway of the vehicle. The second connector part 230 is hereby connected to a fixed electric power supply, and the second end of the cable 208 connected to the first connector part 216 is connected to the electric equipment on the vehicle. If the vehicle is not connected to the fixed electric power supply, then the turn-over-anchor 210 is supported by the transfer arm 214 on the vehicle.

However, it is also possible to have the docking station 212 on the vehicle, and to provide a transfer station, in which the transfer arm 214 is arranged, along a driveway of the vehicle. In this case, the second end of the cable 208 connected to the first connector part 216 of the turn-over-anchor 210 is connected to a fixed electric power supply, and the second connector part 230 of the docking station is connected to the electric equipment of the vehicle. If the vehicle is not connected to the fixed electric power supply, the turn-over-anchor 210 is supported by the transfer arm 214 in the transfer station along a driveway of the vehicle.

The operation of the afore-described device will now be described with reference to FIGS. 14 to 17, assuming that the transfer arm 214 is mounted on the vehicle, e.g. a RTG crane, and the docking station 212 for the turn-over-anchor 210 is located along a driveway of the vehicle.

Figure 14:
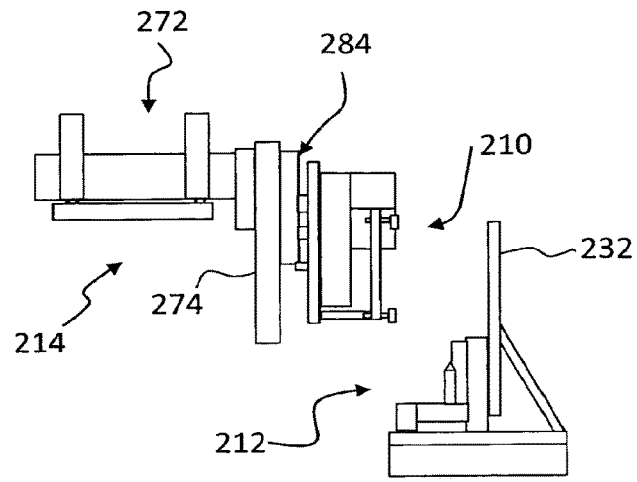
FIG. 14: is a view showing the turn-over-anchor supported by the transfer arm in front of the docking station.

In FIG. 14, the RTG crane, which supports the turn-over-anchor 210 via the hook-plate 284 of the transfer arm 214, is parked in front of the docking station 212, so that a vertical reference plane defined by the horizontal central axis of the extendable arm section 272 and the vertical central axis of the first connector part 216 is substantially perpendicular to the vertical push-plate 232 and horizontally spaced within a range of +/−x cm from the vertical central axis 236 of the second connector part 230, wherein the magnitude of x is determined by the auto-alignment capacity of the turn-over-anchor 210 within the docking station 212, and "+/−" means that x, which is measured from the vertical central axis 236 of the second connector part 216, is indicated as a positive value, if the vertical reference plane is located on the right side, and as a negative value, if the vertical reference plane is located on the left side of the vertical central axis 236 of the second connector part 216. A typical value for an admissible range for this initial lateral alignment error would e.g. be +/−15 cm. It will be noted that, in FIG. 14, the lifting mechanism 274 is located in its uppermost position, the extendable arm section 272 has its shortest length, and the hook-plate 284 supporting the turn-over-anchor 210 is in its neutral centre position.

Figure 15:
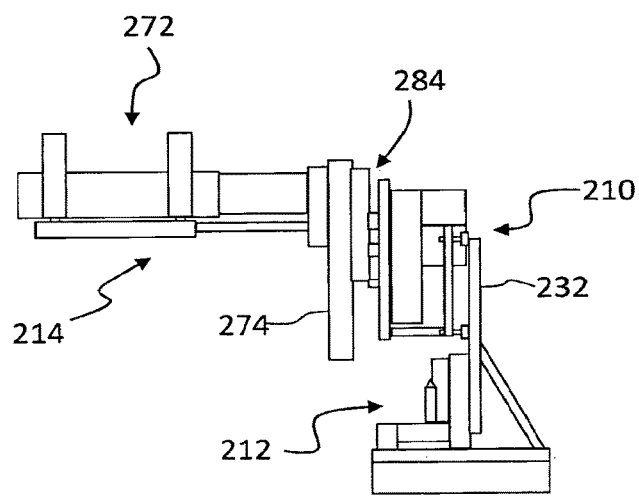
FIG. 15: is a view showing the transfer arm pushing the turn-over-anchor against a push-plate of the docking station.

In FIG. 15, the extendable arm section 272 is shown in an extended position, in which the transfer arm 214 pushes the turn-over-anchor 210 with its spacer elements 240', 240", 242', 242" against the vertical push-plate 232 of the docking station, so that the axes of the first connector part 216 and the second connector part 230 are now both located in a plane parallel to the vertical push-plate 232. The horizontal load cell 302 integrated into the transfer arm 214 warrants that the pressure with which the transfer arm 214 pushes the turn-over-anchor 210 horizontally against the vertical push-plate 232 is sufficient to reliably position the turn-over-anchor with regard to the push-plate 232, but does not exceed a predetermined value, so as not to deform the push-plate 232. The lifting mechanism 274 is, in FIG. 15, still located in its uppermost position, and the hook-plate 284 supporting the turn-over-anchor 210 is still in its neutral centre position.

Figure 16:
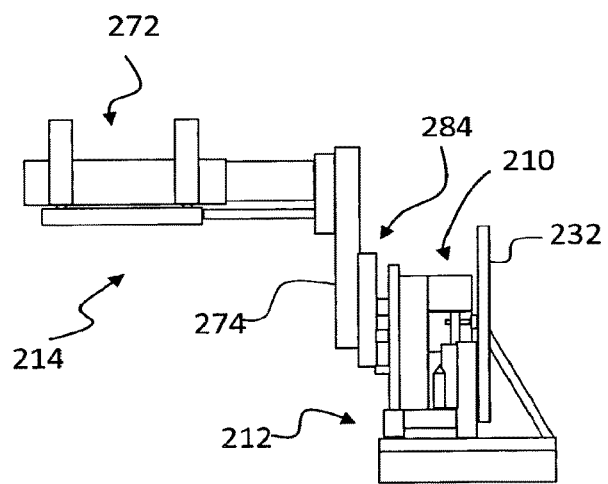
FIG. 16: is a view showing the turn-over-anchor received in the docking station, prior to disengagement of the transfer arm from the turn-over-anchor.

Between the position shown in FIG. 15 and the position shown FIG. 16, the lifting mechanism 274 has been lowered to deposit the turn-over-anchor 210 into the docking station 212. While the lifting mechanism 274 vertically lowers the turn-over-anchor 210 into the docking station 212, the horizontal degree of freedom of the hook-plate 284 enables the guide means (comprising e.g.: the aforementioned lateral guides 238', 238" in the docking station 212 cooperating with the guide rolls 240', 240" arranged laterally on the turn-over-anchor 210; and/or the funnel-shaped inlets of the holes 246', 246" cooperating with the tips of the vertical rods 246', 246") to laterally align the turn-over-anchor 210 within the docking station 212, so that the vertical central axes of both connector parts 216, 230 are finally sufficiently aligned to allow their interconnection along the vertical coupling axis 236. During the lowering of the turn-over-anchor 210 into the docking station 212, the transfer arm 214 continues pushing the turn-over-anchor 210 horizontally against the vertical push-plate 232. However, as soon as the vertical rods 246', 246" have engaged the holes 248', 248", the actuator of the extendable arm section 272 is preferably stopped, so that the turn-over-anchor 210 is now free of any horizontal force applied by the transfer arm 214. The vertical movement of the turn-over-anchor 210 stops when the latter abuts with its base-frame onto the horizontal base 234 of the docking station 212. While the hook-plate 284 continues its vertical downward movement, the upper hook elements 286', 286" disengage the slots 288', 288" in the rear support plate 292 of the turn-over-anchor 210, and the lower support elements 294', 294" disengage the lower rim 296 of the turn-over-anchor 210. The hook-plate 284 can now be retracted by retracting (i.e. by shortening) the extendable arm section 272 of the transfer arm 214.

Figure 17:
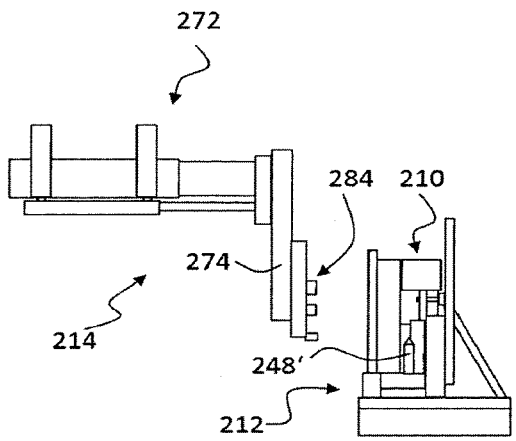
FIG. 17: is a view showing the turn-over-anchor received in the docking station, after disengagement of the transfer arm from the turn-over-anchor.

FIG. 17 shows the transfer arm 214 after full retraction of the extendable arm section 272 (i.e. the latter has its minimum length). The turn-over-anchor 210 now sits in the docking station 212 and the first and second connector parts 216, 230 are interconnected. The lifting mechanism 274 is located in its lowermost position, and the hook-plate 284 is in a spring-biased neutral centre position.

In the position of FIG. 17, the two horizontally spaced vertical rods 246', 246" of the docking station 212, which are engaged in the holes 248', 248" of the turn-over-anchor 210, efficiently block the turn-over-anchor 210 in the docking station 212. They are indeed self-locking in the in the holes 248', 248" of the turn-over-anchor 210, as long as the turn-over-anchor 210 is subjected to a significant force that is not aligned with the vertical coupling axis. Because pulling forces exerted by the cable 208 onto the turn-over-anchor 210 during operation of the RTG crane will never be aligned with the vertical coupling axis 236 (see FIG. 10), such pulling forces may not disconnect the turn-over-anchor 210 from the docking station 212. However, for deliberately disconnecting the turn-over-anchor 210 from the docking station 212, it will be sufficient to lift the turn-over-anchor 210 out of the docking station 212 according to a strictly vertical movement, i.e. without subjecting the turn-over-anchor 210 to a significant force that is not aligned with the vertical coupling axis. Consequently, a device as described hereinbefore does not require a complicated locking mechanism that may not properly unlock during the disconnecting procedure or may not properly operate during the connecting procedure.

For disconnecting the turn-over-anchor 210 from the docking station 212, the transfer arm 214 is first brought in the position shown in FIG. 17. Then the extendable arm section 272 is extended until the hook-plate 284 contacts the rear wall 300 of the turn-over-anchor 210. This contact can e.g. be detected by the horizontal load cell 302 on the transfer arm 214 or by a contact switch or a proximity switch 303 (see FIG. 10). Thereafter the lifting mechanism 274 is actuated to vertically lift the turn-over-anchor 210 out of engagement with the vertical rods of the docking station 212, thereby also disconnecting the first and second connector parts 216, 230. When the transfer arm 214 has reached the position shown in FIG. 15 (i.e. the uppermost position of the lifting mechanism 274), the extendable arm section 272 may retract into the position shown in FIG. 14.

Figure 18:
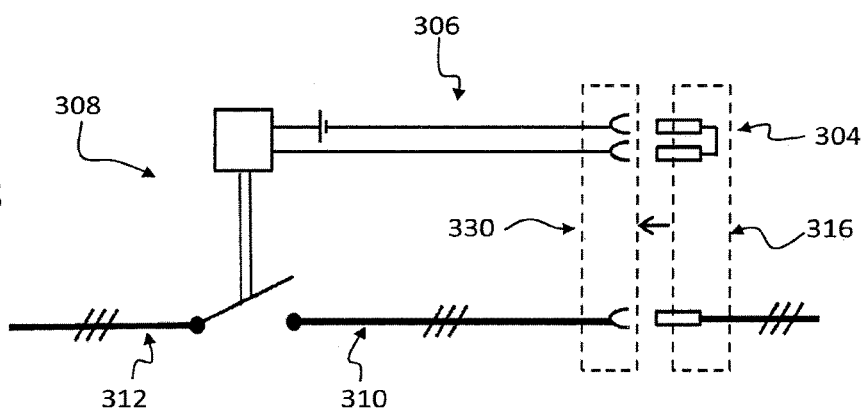
FIG. 18: is a simplified circuit diagram illustrating a preferred electrical circuit for a device in accordance with the invention.

Referring now to FIG. 18, it will be noted that the first connector part 216 advantageously includes two pilot contact elements 304 that are short-circuited within the first connector part 216. As the first connector part 216 interconnects with the second connector part 230, these short-circuited pilot contact elements 304 close a control circuit 306 of a normally open circuit breaker 308, which is interconnected between a fixed electric power supply circuit 310 on the docking station 212 and electric power mains 312. Upon closing of its control circuit 306, the normally open circuit breaker 308 closes and connects the fixed electric power supply circuit 310 on the docking station 212 to the power mains 312. It follows that the second connector part 230 is only set under tension after proper interconnection with the first connector part 216. Similarly, as the first connector part 216 is withdrawn from the second connector part 230, the control circuit 306 is opened, which opens the circuit breaker 308 and immediately interrupts electric power supply from the power mains 312 to the fixed electric power supply circuit 310 on the docking station 212. Thus, the second connector part 230 is already de-energized before the upwardly moving first connector part 216 uncovers it.

Alternatively, the first connector part 216 may also close a normally open switch (not shown) in the docking station 212, when the first connector part 216 starts mating with the second connector part 230. Closing of this switch then closes the control circuit 306 and thereby the normally open circuit breaker 308.

Figure 21:
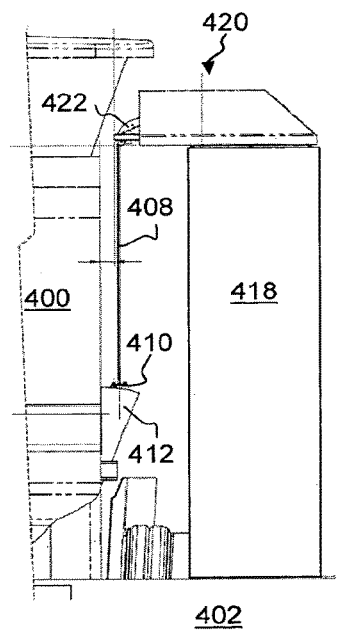
FIG. 21: is an elevation view showing a further device in accordance with the invention, which is used here for connecting a ship to an on-shore electric power supply.
Figure 22:
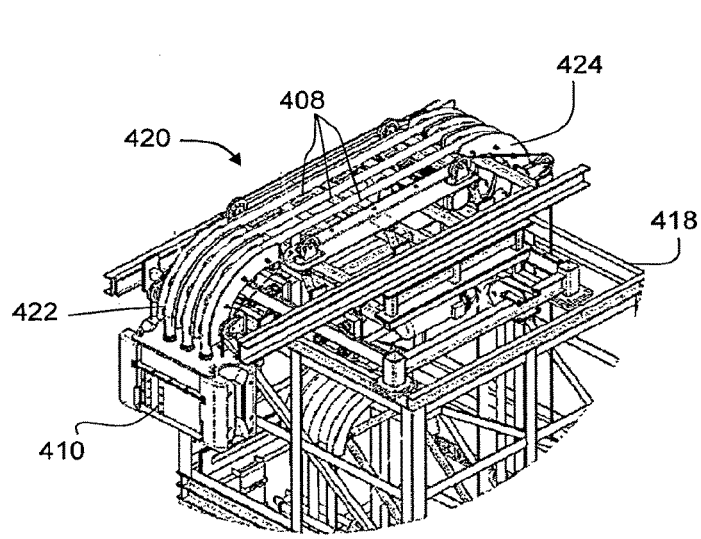
FIG. 22: is a three-dimensional view showing a detail of the device of FIG. 21.
Figure 23:
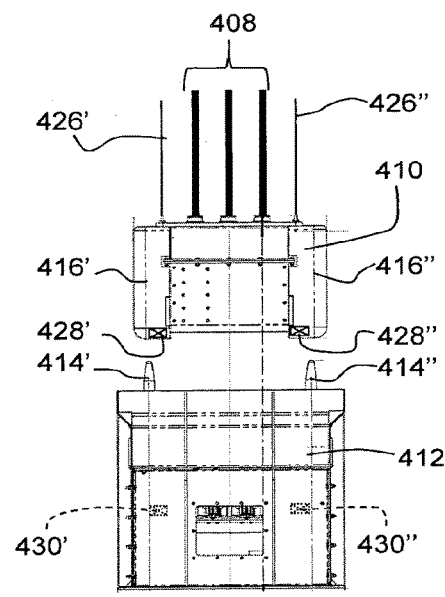
FIG. 23: is a front view showing in the device of FIG. 21 a turn-over-anchor vertically aligned with a docking station.

FIGS. 21 to 23 show a device for automatically connecting a ship 400 to an on-shore electric power supply, which device implements important aspects of the invention as described hereinbefore and includes further advantageous features.

In FIG. 21, reference number 400 points to a ship moored along a quayside 402. The device for automatically connecting the ship 400 to the on-shore electric power supply basically comprises following main parts: one or more electric power cables 408; a turn-over-anchor 410 including a first connector part connected to a free end of the power cable(s) 408; and a docking station 412 including a second connector part configured for mating with the first connector part according to a vertical coupling axis, when the turn-over-anchor 410 is vertically deposited into in the docking station 412.

FIG. 21 shows the turn-over-anchor 410 received in the in the docking station 412, which is arranged laterally on the ship 400. In FIG. 23, the turn-over-anchor 410 is located vertically above the docking station 412, ready for being vertically deposited into the docking station 412.

As further seen in FIG. 23, the docking station 412 includes, as described hereinbefore, two horizontally spaced vertical guide rods 414', 414", each of these guide rods being arranged so as to vertically penetrate into a guide opening or guide hole 416', 416" of the turn-over-anchor 410, when the latter is deposited into the docking station 410.

The device illustrated by FIGS. 21 and 22 further comprises a turn-over-tower 418. The latter supports a cantilevered turn-over-arm 420 with a front cable guide 422 and a rear cable guide 424. The turn-over-arm 420 is located higher than the docking station 412, even at high tide. The power cables 408 vertically drop from the front cable guide 422. The front cable guide 422 and/or the turn-over-arm 420 are advantageously movable, so as to be capable of vertically aligning the turn-over-anchor 410 with the docking station 412. Alternatively or additionally, the turn-over-tower 418 may be movable on the quayside and/or the docking station 412 may be movable relative to the ship 400. The turn-over-tower 418 may further include a telescopic section so as to be able to adjust the height In an alternative embodiment, the turn-over-tower 418 is replaced by an arm that is advantageously pivotable about an horizontal axis and/or vertical axis and may also include a telescopic section. The docking station 412 may be supported by a cantilevered arm, which is advantageously movable relative to the ship 400, so as to be able to bring the docking station 412 into a coupling position, in which it is easy to vertically align the turn-over-anchor 410 with the docking station 412.

When the turn-over-anchor 410 and the docking station 412 are properly aligned, the turn-over-anchor 410 is lowered by gravity towards and into the docking station 412, wherein the guide rods 414', 414" of the docking station 412 are capable of engaging the guide holes 416', 416" in the turn-over-anchor 410, guiding thereby the turn-over-anchor 410 into a contact position, wherein the first and second connector parts establish electrical contact.

As seen in FIGS. 21 and 22, there are 3 power cables 408 connected to the turn-over-anchor 410. These three cables 408 are guided in parallel on the turn-over-arm 420; and the front cable guide 422 is designed so that the three cables 408 leave the latter in parallel with their central axes located in one common vertical plane. This arrangement efficiently prevents a twisting of the turn-over-anchor 410 about the vertical coupling axis, thereby making an alignment of the turn-over-anchor 410 and the docking station easier. It will further be noted that two support wires 426', 426" are attached to the turn-over-anchor 410. These support wires 426', 426" are connected to winches (not shown), which allow to lower and raise the relatively heavy turn-over-anchor 410. In this embodiment, the power cables 408 are not wound around cable reels, but simply form a cable loop within the turn-over-tower 418. This cable loop may be equipped with a counterweight. Alternatively, the power cables 408 could also be wound around parallel cable reels or winches.

In an alternative embodiment, the docking station 412 is arranged on the quayside, advantageously on a movable trolley or rail vehicle, which is itself connected to an on-shore electric power supply. The power cables 408 with the turn-over-anchor 410 attached thereto are in this case arranged on the ship. A movable turn-over-arm installed on the ship allows to vertically align the turn-over-anchor 410 with the docking station 412 on the quayside. Once this alignment is achieved, the turn-over-anchor 410 is lowered first towards and then into the docking station 412.

The automatic coupling devices as disclosed hereinbefore may further include a magnetic connection assistance device. The latter comprises electromagnets associated with the turn-over-anchor and the docking station (see for example reference numbers 428', 428" and 430', 430" in FIG. 23). When the turn-over-anchor is deposited into the docking station, the electromagnets 428', 428" and 430', 430" are powered so that the electromagnets 430', 430" of the docking station attract the electromagnets 428', 428" of the turn-over-anchor according to the vertical coupling axis, thereby assisting the gravity connection process. When the turn-over-anchor is lifted out of the docking station, the electromagnets 428', 428" and 430', 430" are either unpowered or, most preferably, powered so that the electromagnets of the docking station 430', 430" now repel the electromagnets 428', 428" of the turn-over-anchor, thereby assisting the disconnection process and making it smoother. Control circuits are used to control powering on/off of the electromagnets and magnetic polarity inversion. These control circuits advantageously comprise detectors (e.g. mechanically actuated switches or photo-electric sensors) detecting when the guiding means of the docking station engage with the guiding means of the turn-over-anchor, respectively when these guiding means disengage. When the detectors detect engagement of the guiding means, the electromagnets are powered. When the detectors detect disengagement of the guiding means, the electromagnets are unpowered. Magnetic polarity inversion is triggered by a command starting the disconnection sequence. It will be noted that the electromagnets associated with the turn-over-anchor or those associated with the docking station may be replaced by permanent magnets.

Last but not least, it will be noted that the devices described hereinbefore may also be used for transferring electrical energy from the ship to an on-shore consumer, respectively from a vehicle to a stationary consumer.

| Reference signs list | |
|---|---|
| 10 | rubber tired gantry (RTG) crane |
| 11 | fixed electric power supply line |
| 12 | frame bridge |
| 14 | mobile platform |
| 16 | wheels equipped with rubber tires |
| 18', 18" | first traveling lane second traveling lane |
| 20 | freight containers |
| 22', 22" | stacking areas |
| 24', 26' | first pair of runways |
| 24", 26" | second pair of runways |
| 28 | power cable |
| 30 | cable reel or winch |
| 32 | arrow indicating traveling direction |

-continued

Reference signs list

| | |
|---|---|
| 34', 34" | trenches |
| 36 | arrow indicating traveling direction |
| 38 | cable deflection device |
| 40 | rollers |
| 42 | first (mobile) connector part |
| 43 | head of 42 |
| 44 | second (fixed) connector part |
| 45 | head of 44 |
| 46 | connection pit |
| 47 | central vertical axis of 44 |
| 48 | mobile unit or turn-over-anchor |
| 50 | fixed unit or docking station |
| 52 | first guiding device |
| 54 | parking station |
| 56 | second guiding device (cooperating with 52) |
| 58', 58" | rod-like guide members |
| 59', 59" | tip ends of 58', 58" |
| 60 | guiding block |
| 62', 62" | guide openings |
| 64', 64" | funnel-shaped inlet |
| 66', 66" | cylindrical portion |
| 68', 68" | funnel-shaped inlet |
| 70', 70" | rod-like aligning members |
| 72 | cavity in 60 |
| 74 | protection cover of 44 |
| 76 | first half-cover |
| 78 | second half-cover |
| 80 | axis of 76 |
| 82 | axis of 78 |
| 84 | spring associated with 76 |
| 86 | spring associated with 78 |
| 88 | mechanical stop for 76 |
| 90 | mechanical stop for 78 |
| 92 | lever associated with 76 |
| 94 | lever associated with 78 |
| 96 | rim portion of 60 |
| 98 | rim portion of 60 |
| 100 | interior vertical wall of 72 |
| 102 | interior vertical wall of 72 |
| 104 | curved guide surfaces on 60 |
| 104' | arrow indicating cable traction (when the power cable 28 is guided by 106) |
| 106 | curved guide surfaces on 60 |
| 106' | arrow indicating cable traction (when the power cable 28 is guided by 106) |
| 108 | fixed curved guide surface |
| 110 | fixed curved guide surface |
| 112 | metallic casing |
| 120 | Short-circuited pilot contact elements |
| 122 | control circuit of 124 |
| 124 | circuit breaker |
| 126 | power mains |
| 208 | cable |
| 210 | turn-over-anchor |
| 212 | docking station |
| 214 | transfer arm |
| 216 | first connector part |
| 218 | junction box |
| 220 | support frame |
| 222 | cable drum |
| 224 | cable outlet |
| 226 | first location on 222 |
| 228 | second location on 222 |
| 230 | second connector part |

-continued

Reference signs list

| | |
|---|---|
| 232 | vertical push-plate |
| 234 | horizontal base |
| 236 | vertical coupling axis of 230 |
| 236' | vertical coupling axis of 216 |
| 238', 238" | lateral guides |
| 240', 240" | lower spacer elements |
| 242', 242" | upper spacer elements |
| 244', 244" | top surface of 238', 238" |
| 246', 246" | vertical rods |
| 248', 248" | holes for 246', 246" |
| 250', 250" | base plates of 210 |
| 252 | protection cover for 216 |
| 254 | horizontal pivoting axis of 252 |
| 256 | pusher element |
| 258 | lever arm |
| 262 | protection cover for 230 |
| 264 | horizontal pivoting axis of 262 |
| 266 | pusher element |
| 268 | lever arm |
| 214 | transfer arm |
| 272 | extendable arm section of 214 |
| 274 | vertical lifting mechanism of 214 |
| 276 | guide rods or rails |
| 278 | low speed spindle drive |
| 280 | electric motor |
| 282 | gear box |
| 284 | hook-plate (coupling device for 210 on 214) |
| 286', 286" | upper hook elements |
| 288', 288" | slots |
| 290', 290" | funnel shaped inlet openings of 288', 288" |
| 292 | rear support plate of 210 |
| 294', 294" | lower support elements |
| 296 | lower rim of 210 |
| 298 | central stopper on 284 |
| 300 | rear wall of 210 |
| 302 | horizontal load cell |
| 303 | proximity switch |
| 304 | pilot contact elements |
| 306 | control circuit |
| 308 | normally open circuit breaker |
| 310 | fixed electric power supply circuit on 212 |
| 312 | electric power mains |
| 314 | push rod |
| 316 | spring |
| 318 | switch |
| 400 | ship |
| 402 | quayside |
| 408 | power cables |
| 410 | turn-over-anchor |
| 412 | docking station |
| 414', 414" | guide rods |
| 416', 416" | guide openings or holes |
| 418 | turn-over-tower |
| 420 | turn-over-arm |
| 422 | front cable guide |
| 424 | rear cable guide |
| 426', 426" | support wires |

| Reference signs list | |
|---|---|
| 428', 428" | electromagnets of 410 |
| 430', 430" | electromagnets of 412 |

The invention claimed is:

1. A device for automatically connecting a vehicle via a cable to an electric power supply, said device comprising:
   a turn-over-anchor including a first connector part connected to a free end of said cable;
   a docking station including a second connector part configured for mating with said first connector part according to a vertical coupling axis, when said turn-over-anchor is vertically deposited into said docking station;
   two horizontally spaced vertical guide rods, each of said guide rods being arranged so as to vertically penetrate into a guide opening or guide hole of an opposite element, when said turn-over-anchor is deposited into said docking station, and being dimensioned so as to be self-locking in said guide hole, if said turn-over-anchor is subjected to a significant force that is not aligned with said vertical coupling axis;
   a lifting device for vertically lowering said turn-over anchor into said docking station and for vertically lifting it out of said docking station,
   wherein:
   said turn-over-anchor is supported by said lifting device via two horizontally spaced hook elements engaging two funnel shaped slots;
   said hook elements supported by said lifting device; and
   said two funnel shaped slots are arranged on the rear side of said turn-over-anchor.

2. The device as claimed in claim 1, wherein:
   said turn-over-anchor includes a cable drum, said free end of said cable connected to said first connector part being guided at least partly around said cable drum; and
   said turn-over-anchor is designed so that said cable may leave said cable drum at two locations spaced by about 180° around said cable drum and eccentric relative to said vertical coupling axis, so that the force said cable exerts onto said turn-over-anchor is never aligned with said vertical coupling axis.

3. The device as claimed in claim 1, wherein:
   said docking station includes a vertical push-plate; and
   said turn-over-anchor includes adjustable guide elements protruding from its front face, so that when said turn-over-anchor is pushed with said adjustable guide elements against said vertical push-plate, the axes of the first connector part and the second connector part are both located in a plane parallel to the vertical push-plate.

4. A device for automatically connecting a vehicle via a cable to an electric power supply, said device comprising:
   a turn-over-anchor including a first connector part connected to a free end of said cable;
   a docking station including a second connector part configured for mating with said first connector part according to a vertical coupling axis, when said turn-over-anchor is vertically deposited into said docking station; and
   two horizontally spaced vertical guide rods, each of said guide rods being arranged so as to vertically penetrate into a guide opening or guide hole of an opposite element, when said turn-over-anchor is deposited into said docking station and being dimensioned so as to be self-locking in said guide hole, if said turn-over-anchor is subjected to a significant force that is not aligned with said vertical coupling axis;
   wherein said docking station includes a vertical push-plate;
   said turn-over-anchor includes adjustable guide elements protruding from its front face, so that when said turn-over-anchor is pushed with said adjustable guide elements against said vertical push-plate, the axes of the first connector part and the second connector part are both located in a plane parallel to the vertical push-plate;
   said device further comprises a transfer arm for transferring said turn-over-anchor into and out of said docking station, said transfer arm including:
   a first arm section for horizontally pushing said turn-over-anchor against said vertical push-plate;
   a vertical lifting mechanism supported by said first arm section for vertically lowering said turn-over-anchor into in said docking station and vertically lifting it out of said docking station;
   a coupling device supported by said vertical lifting mechanism for coupling the latter to said turn-over-anchor, wherein said coupling device has with regard to said vertical lifting mechanism a horizontal degree of freedom for floating perpendicularly to a vertical plan containing the central axis of said first arm section; and
   said device further including a guide capable of laterally aligning said turn-over-anchor within said docking station by using said horizontal degree of freedom of said coupling device, when said turn-over-anchor is vertically deposited into said docking station.

5. The device as claimed in claim 4, wherein said guide comprises:
   lateral guides in said docking station defining a funnel shaped inlet opening for said turn-over-anchor; and
   guide rolls arranged laterally on said turn-over-anchor for interacting with said lateral guides in said docking station.

6. A device for automatically connecting a vehicle via a cable to an electric power supply, said device comprising:
   a turn-over-anchor including a first connector part connected to a free end of said cable;
   a docking station including a second connector part configured for mating with said first connector part according to a vertical coupling axis, when said turn-over-anchor is vertically deposited into said docking station;
   two horizontally spaced vertical guide rods, each of said guide rods being arranged so as to vertically penetrate into a guide opening or guide hole of an opposite element, when said turn-over-anchor is deposited into said docking station, and being dimensioned so as to be self-locking in said guide hole, if said turn-over-anchor is subjected to a significant force that is not aligned with said vertical coupling axis;
   wherein said first and/or said second connector part includes a normally closed protection cover capable of covering said first, respectively second connector part, wherein its opening is triggered by said turn-over-anchor being deposited into said docking station,
   said protection cover formed by two opposing half-covers, pivotable about two parallel, substantially horizontal axes located on two opposite sides of said second connector part, wherein in a closed position, one half-cover partially overlaps the other half-cover.

7. The device as claimed in claim 6, wherein:
a normally open circuit breaker is interconnected between said electric power supply and said second connector part;
a normally open control circuit is associated with said circuit breaker to trigger a closing of the latter when closed itself; and
closing means are associated with said control circuit for closing the latter when said first connector part and said second connector part interconnect; wherein said closing means preferably comprises:
either two short circuited pilot contact elements in said first connector part mating with two pilot contact elements in said second connector part, which form an open contact in said control circuit; or
a normally open switch, which forms an open contact in said control circuit, and is actuated into its closed position, when said first connector part and said second connector part interconnect.

8. A device for automatically connecting a vehicle via a cable to an electric power supply, said device comprising:
a turn-over-anchor including a first connector part connected to a free end of said cable;
a docking station including a second connector part configured for mating with said first connector part according to a vertical coupling axis, when said turn-over-anchor is vertically deposited into said docking station;
two horizontally spaced vertical guide rods, each of said guide rods being arranged so as to vertically penetrate into a guide opening or guide hole of an opposite element, when said turn-over-anchor is deposited into said docking station, and being dimensioned so as to be self-locking in said guide hole, if said turn-over-anchor is subjected to a significant force that is not aligned with said vertical coupling axis;
a cantilevered turn-over-arm with a front cable guide; and
a lifting device for vertically lowering said turn-over-anchor into said docking station and for vertically lifting it out of said docking station,
wherein the front cable guide and/or the turn-over-arm are movable relative to the docking station, so as to be capable of vertically aligning the turn-over-anchor with the docking station.

9. The device as claimed in claim 8, wherein the turn-over-anchor is connected to at least three power cables, which are guided in parallel on the turn-over-arm; and wherein the front cable guide is designed so that the power cables leave the latter in parallel with their central axes located in one common vertical plane.

10. The device as claimed in claim 8, further comprising a turn-over-tower supporting said turn-over-arm.

11. The device as claimed in claim 8, wherein the turn-over-arm that is pivotable about a horizontal and/or vertical axis, so as to be capable of vertically aligning the turn-over-anchor with the docking station.

12. The device as claimed in claim 8, further comprising a movable arm on which said docking station is mounted.

13. The device as claimed in claim 8, further including a magnetic connection assistance device, comprising:
electromagnets associated with the turn-over-anchor and the docking station; and
a control circuit capable of powering said electromagnets so that:

a) when the turn over anchor is deposited into the docking station, the electromagnets of the docking station attract the electromagnets of the turn-over-anchor according to the vertical coupling axis; and
b) when the turn over anchor is lifted out of the docking station, the electromagnets of the docking station repel the electromagnets of the turn-over-anchor according to the vertical coupling axis.

14. A device for automatically connecting a vehicle via a cable to an electric power supply, said device comprising:
a turn-over-anchor including a first connector part connected to a free end of said cable;
a docking station including a second connector part configured for mating with said first connector part according to a vertical coupling axis, when said turn-over-anchor is vertically deposited into in said docking station; and
two horizontally spaced vertical guide rods, each of said guide rods:
being arranged so as to vertically penetrate into a guide opening or guide hole of an opposite element, when said turn-over-anchor is deposited into said docking station; and
being dimensioned so as to be self-locking in said guide hole, if said turn-over-anchor is subjected to a significant force that is not aligned with said vertical coupling axis;
said turn-over-anchor further includes a cable drum, said free end of said cable connected to said first connector part being guided at least partly around said cable drum; and
said turn-over-anchor is designed so that said cable may leave said cable drum at two locations spaced by about 180° around said cable drum and eccentric relative to said vertical coupling axis, so that the force said cable exerts onto said turn-over-anchor is never aligned with said vertical coupling axis.

15. A device for automatically connecting a vehicle via a cable to an electric power supply, said device comprising:
a turn-over-anchor including a first connector part connected to a free end of said cable;
a docking station including a second connector part configured for mating with said first connector part according to a vertical coupling axis, when said turn-over-anchor is vertically deposited into in said docking station; and
two horizontally spaced vertical guide rods, each of said guide rods:
being arranged so as to vertically penetrate into a guide opening or guide hole of an opposite element, when said turn-over-anchor is deposited into said docking station; and
being dimensioned so as to be self-locking in said guide hole, if said turn-over-anchor is subjected to a significant force that is not aligned with said vertical coupling axis;
said turn-over-anchor including said first connector part further comprises a guiding block;
an upper part of said guiding block forms at least one curved guide surface for guiding said power cable when a horizontal force component is exerted on said power cable; and
said second connector part is mounted in a casing which forms at its outlet a fixed curved guide surface in extension of the curved guide surface formed by said upper part of said guide block.

16. The device as claimed in claim 8, wherein:

each of said guide holes has a funnel-shaped inlet followed by a substantially cylindrical portion, so that, when said turn-over-anchor is lowered into said docking station, said funnel shaped inlet cooperates with a tip of one of said guide rods to guide said guide rod into said substantially cylindrical portion, and thereafter said substantially cylindrical portion cooperates with said shaft portion of said guide rod to guide said turn over anchor into contact position.

17. The device as claimed in claim 15, wherein:

said vehicle includes a transfer arm for transferring said turn-over-anchor into and out of said docking station, which is located along a driveway of said vehicle; or said docking station is arranged on said vehicle, and a transfer station is located along a driveway of said vehicle and includes a transfer arm for transferring said turn-over-anchor into and out of said docking station.

18. The device as claimed in claim 15, further comprising:

a cable reel with said cable wound thereon;

wherein said guide openings form part of a first guiding device associated with said turn-over-anchor, and said guide rods form part of a second guiding device associated with said docking station; and wherein, when said first connector part and said second connector part are vertically aligned, and said cable is unwound from said cable reel, so as to lower said turn-over-anchor towards said docking station, said first guiding device is capable of engaging said second guiding device and of sliding by gravity along said second guiding device, guiding thereby said turn-over-anchor into a contact position, in which said first connector part establishes electrical contact with said second connector part.

19. The device as claimed in claim 18, wherein:

said second connector part is arranged between said vertical guide rods; and said first guiding device comprises a guiding block in which said two guide openings are arranged; and said first connector part is arranged in a cavity of said guiding block between said two guide openings.

20. The device as claimed in claim 19, further comprising a parking station for said first guiding device, said parking station including an aligning device for aligning said first guiding device in a pre-set angular position in said parking station, when said power cable is wound onto said cable reel.

21. The device as claimed in claim 20, wherein:

said alignment device comprises two vertically extending aligning rods;

said guiding block comprises an aligning opening for each of said aligning rods, each of said aligning openings having a funnel-shaped inlet followed by a substantially cylindrical portion; and said guide openings and said aligning openings are advantageously formed by two through-holes vertically extending through said guiding block.

22. The device as claimed in claim 8, wherein the turn-over-anchor is supported by at least two support wires for lifting or lowering the turn-over-anchor.

* * * * *